United States Patent
Hagerty et al.

(10) Patent No.: US 7,985,811 B2
(45) Date of Patent: Jul. 26, 2011

(54) METHOD FOR CONTROLLING SHEETING IN GAS PHASE REACTORS

(75) Inventors: Robert O. Hagerty, La Porte, TX (US); Michael E. Muhle, Kingwood, TX (US); Agapios K. Agapiou, Humble, TX (US); Chi-I Kuo, Humble, TX (US); Mark G. Goode, Hurricane, WV (US); F. David Hussein, Cross Lanes, WV (US); Richard B. Pannell, Kingwood, TX (US); John F. Szul, Hurricane, WV (US)

(73) Assignee: Univation Technologies, LLC, Houston, TX (US)

( * ) Notice: Subject to any disclaimer, the term of this patent is extended or adjusted under 35 U.S.C. 154(b) by 354 days.

(21) Appl. No.: 12/217,945

(22) Filed: Jul. 10, 2008

(65) Prior Publication Data

US 2009/0018279 A1 Jan. 15, 2009

Related U.S. Application Data

(63) Continuation-in-part of application No. 11/011,421, filed on Dec. 14, 2004, now abandoned.

(60) Provisional application No. 60/534,026, filed on Jan. 2, 2004.

(51) Int. Cl.
*C08F 2/34* (2006.01)
*C08F 2/00* (2006.01)
*G01R 29/12* (2006.01)
*B01J 8/18* (2006.01)

(52) U.S. Cl. .............. 526/60; 324/457; 526/74; 422/139

(58) Field of Classification Search .................. 526/60, 526/74; 324/457; 422/139
See application file for complete search history.

(56) References Cited

U.S. PATENT DOCUMENTS

| | | | |
|---|---|---|---|
| 3,221,002 A | 11/1965 | Orzechowski et al. |
| 3,487,112 A | 12/1969 | Paulik et al. |
| 3,687,920 A | 8/1972 | Johnson |
| 4,012,574 A | 3/1977 | Jones et al. |
| 4,077,904 A | 3/1978 | Noshay et al. |
| 4,086,408 A | 4/1978 | Karol et al. |
| 4,101,445 A | 7/1978 | Levine et al. |
| 4,115,639 A | 9/1978 | Brown et al. |
| 4,124,532 A | 11/1978 | Giannini et al. |
| 4,182,814 A | 1/1980 | Bernemann et al. |
| 4,302,565 A | 11/1981 | Goeke et al. |
| 4,302,566 A | 11/1981 | Karol et al. |
| 4,306,044 A | 12/1981 | Charsley |
| 4,376,062 A | 3/1983 | Hamer et al. |
| 4,376,191 A | 3/1983 | Geck |
| 4,379,758 A | 4/1983 | Wagner et al. |
| 4,472,559 A | 9/1984 | Maehara et al. |
| 4,482,687 A | 11/1984 | Noshay et al. |

(Continued)

FOREIGN PATENT DOCUMENTS

CN 1178222 A 12/2004

(Continued)

OTHER PUBLICATIONS

Johnson et al., "New Pd(II)- and Ni(II)-Based Catalysts for Polymerization of Ethylene and α-Olefins", J. Am. Chem. Soc. 1995, 117, 6414-6415.

(Continued)

*Primary Examiner* — William K Cheung

(57) ABSTRACT

Embodiments of the present invention relate to measuring and controlling static in a gas phase reactor polymerization. In particular, embodiments relate to monitoring carryover static in an entrainment zone during gas phase polymerization to determine the onset of reactor discontinuity events such as chunking and sheeting. Embodiments also relate to monitoring carryover static to determine the need for effective additions of continuity additives that minimize reactor static activity and thereby preventing discontinuity events.

27 Claims, 12 Drawing Sheets

Instrument Locations on Pilot-Scale Reactor

U.S. PATENT DOCUMENTS

| | | |
|---|---|---|
| 4,532,311 A | 7/1985 | Fulks et al. |
| 4,560,671 A | 12/1985 | Gross et al. |
| 4,564,605 A | 1/1986 | Collomb-Ceccarini et al. |
| 4,689,437 A | 8/1987 | Murray |
| 4,719,193 A | 1/1988 | Levine et al. |
| 4,721,763 A | 1/1988 | Bailly et al. |
| 4,755,495 A | 7/1988 | Cann et al. |
| 4,810,397 A * | 3/1989 | Dvoracek ............... 508/267 |
| 4,855,370 A | 8/1989 | Chirillo et al. |
| 4,879,359 A | 11/1989 | Chamla et al. |
| 4,960,741 A | 10/1990 | Bailly et al. |
| 4,978,722 A | 12/1990 | Goko et al. |
| 5,019,633 A | 5/1991 | Wagner et al. |
| 5,026,795 A | 6/1991 | Hogan |
| 5,034,480 A | 7/1991 | Funk et al. |
| 5,034,481 A | 7/1991 | Funk et al. |
| 5,055,438 A | 10/1991 | Canich |
| 5,057,475 A | 10/1991 | Canich et al. |
| 5,064,802 A | 11/1991 | Stevens et al. |
| 5,066,736 A | 11/1991 | Dumain et al. |
| 5,066,737 A | 11/1991 | Job |
| 5,070,055 A | 12/1991 | Schramm et al. |
| 5,093,415 A | 3/1992 | Brady, III et al. |
| 5,096,867 A | 3/1992 | Canich |
| 5,126,414 A | 6/1992 | Cooke et al. |
| 5,145,819 A | 9/1992 | Winter et al. |
| 5,149,819 A | 9/1992 | Satoh et al. |
| 5,198,401 A | 3/1993 | Turner et al. |
| 5,227,440 A | 7/1993 | Canich et al. |
| 5,233,049 A | 8/1993 | Dinan et al. |
| 5,239,022 A | 8/1993 | Winter et al. |
| 5,243,001 A | 9/1993 | Winter et al. |
| 5,264,405 A | 11/1993 | Canich |
| 5,276,208 A | 1/1994 | Winter et al. |
| 5,296,434 A | 3/1994 | Karl et al. |
| 5,304,614 A | 4/1994 | Winter et al. |
| 5,317,036 A | 5/1994 | Brady, III et al. |
| 5,321,106 A | 6/1994 | LaPointe |
| 5,329,031 A | 7/1994 | Miyake et al. |
| 5,332,706 A | 7/1994 | Nowlin et al. |
| 5,410,002 A | 4/1995 | Govoni et al. |
| 5,427,991 A | 6/1995 | Turner |
| 5,461,123 A | 10/1995 | Song et al. |
| 5,473,028 A | 12/1995 | Nowlin et al. |
| 5,492,975 A | 2/1996 | Peifer et al. |
| 5,527,752 A | 6/1996 | Reichle et al. |
| 5,539,124 A | 7/1996 | Etherton et al. |
| 5,554,775 A | 9/1996 | Krishnamurti et al. |
| 5,610,244 A | 3/1997 | Govoni et al. |
| 5,627,243 A | 5/1997 | Hämäläinen et al. |
| 5,637,660 A | 6/1997 | Nagy et al. |
| 5,643,847 A | 7/1997 | Walzer, Jr. |
| 5,661,095 A | 8/1997 | Meverden et al. |
| 5,677,401 A | 10/1997 | Kataoka et al. |
| 5,723,398 A | 3/1998 | Rosen et al. |
| 5,731,392 A | 3/1998 | Ali et al. |
| 5,744,417 A | 4/1998 | Nagy et al. |
| 5,747,406 A | 5/1998 | Reichle et al. |
| 5,753,578 A | 5/1998 | Santi et al. |
| 5,756,611 A | 5/1998 | Etherton et al. |
| 5,763,723 A | 6/1998 | Reagen et al. |
| 5,849,655 A | 12/1998 | Shamshoum et al. |
| 5,851,945 A | 12/1998 | Turner et al. |
| 5,852,143 A | 12/1998 | Sishta et al. |
| 5,852,144 A | 12/1998 | Badley |
| 5,852,145 A | 12/1998 | McLain et al. |
| 5,852,146 A | 12/1998 | Reichle et al. |
| 5,854,164 A | 12/1998 | Shiraishi et al. |
| 5,854,363 A | 12/1998 | Jung et al. |
| 5,856,258 A | 1/1999 | Marks et al. |
| 5,856,547 A | 1/1999 | Jung et al. |
| 5,858,903 A | 1/1999 | Sylvester et al. |
| 5,859,158 A | 1/1999 | Mukaiyama et al. |
| 5,866,663 A | 2/1999 | Brookhart et al. |
| 5,869,585 A | 2/1999 | Mink et al. |
| 5,880,241 A | 3/1999 | Brookhart et al. |
| 5,929,266 A | 7/1999 | Jones et al. |
| 6,008,662 A | 12/1999 | Newton et al. |
| 6,103,357 A | 8/2000 | Selinder et al. |
| 6,103,620 A | 8/2000 | Kim |
| 6,111,034 A | 8/2000 | Goode et al. |
| 6,335,402 B1 | 1/2002 | Mihan et al. |
| 6,831,140 B2 * | 12/2004 | Muhle et al. ............... 526/74 |
| 2002/0103072 A1 | 8/2002 | Patrick et al. |
| 2003/0229186 A1 * | 12/2003 | Mawson et al. ............ 526/61 |
| 2004/0132931 A1 | 7/2004 | Muhle et al. |
| 2005/0148742 A1 | 7/2005 | Hagerty et al. |

FOREIGN PATENT DOCUMENTS

| | | |
|---|---|---|
| EP | 0416815 A2 | 3/1991 |
| EP | 0420436 A1 | 4/1991 |
| EP | 0453116 A1 | 10/1991 |
| EP | 0513380 | 11/1992 |
| EP | 0549252 A1 | 6/1993 |
| EP | 0560035 A1 | 9/1993 |
| EP | 0578838 A | 1/1994 |
| EP | 0632819 B1 | 12/1994 |
| EP | 0638595 A | 2/1995 |
| EP | 0735057 B1 | 10/1996 |
| EP | 0757996 B1 | 2/1997 |
| EP | 0 811 638 A2 * | 12/1997 |
| EP | 0811638 A2 | 12/1997 |
| EP | 0816384 A2 | 1/1998 |
| EP | 0748821 B1 | 9/1998 |
| EP | 0874005 A1 | 10/1998 |
| EP | 0816372 A1 | 7/2000 |
| EP | 1308464 A1 | 5/2003 |
| EP | 0839834 A2 | 10/2003 |
| EP | 1699830 | 6/2010 |
| GB | 2105355 | 3/1983 |
| WO | WO 91/04257 | 4/1991 |
| WO | WO 92/00333 | 1/1992 |
| WO | WO 93/08199 | 4/1993 |
| WO | WO 93/08221 | 4/1993 |
| WO | WO 94/03506 | 2/1994 |
| WO | WO 94/07928 | 4/1994 |
| WO | WO 95/07140 | 10/1995 |
| WO | WO 96/00244 | 1/1996 |
| WO | WO 96/08520 | 3/1996 |
| WO | WO 96/11961 | 4/1996 |
| WO | WO 96/23010 | 8/1996 |
| WO | WO 96/33202 | 10/1996 |
| WO | WO 96/34021 | 10/1996 |
| WO | WO 97/14721 | 4/1997 |
| WO | WO 97/15602 | 5/1997 |
| WO | WO 97/17379 | 5/1997 |
| WO | WO 97/06186 | 7/1997 |
| WO | WO 97/27224 | 7/1997 |
| WO | WO 97/46599 | 12/1997 |
| WO | WO 97/48735 | 12/1997 |
| WO | WO 98/11144 | 3/1998 |
| WO | WO 98/12231 | 3/1998 |
| WO | WO 98/22486 | 5/1998 |
| WO | WO 98/41529 | 9/1998 |
| WO | WO 98/41530 | 9/1998 |
| WO | WO 98/42664 | 10/1998 |
| WO | WO 98/46650 | 10/1998 |
| WO | WO 98/46651 | 10/1998 |
| WO | WO 99/01481 | 1/1999 |
| WO | WO 99/02540 | 1/1999 |
| WO | WO 99/14221 | 3/1999 |
| WO | WO 99/61486 | 12/1999 |
| WO | WO 01/44323 | 6/2001 |
| WO | WO 02/40554 | 5/2002 |
| WO | WO 2005/068507 | 7/2005 |

OTHER PUBLICATIONS

Johnson et al., "Copolymerization of Ethylene and Propylene with Functionalized Vinyl Monomers by Palladium(II) Catalysts", J. Am. Chem. Soc., 1996, 118, 267-268.

Britovsek et al., "Novel olefin polymerization catalysts based on iron and cobalt," Chem. Commun., 1998, pp. 849-850.

Scollard et al., "Sterically Demanding Diamide Ligands: Synthesis and Structure of $d^0$ Zirconium Alkyl Derivatives," Organometallics, 1995, 14, 5478-5480.

* cited by examiner

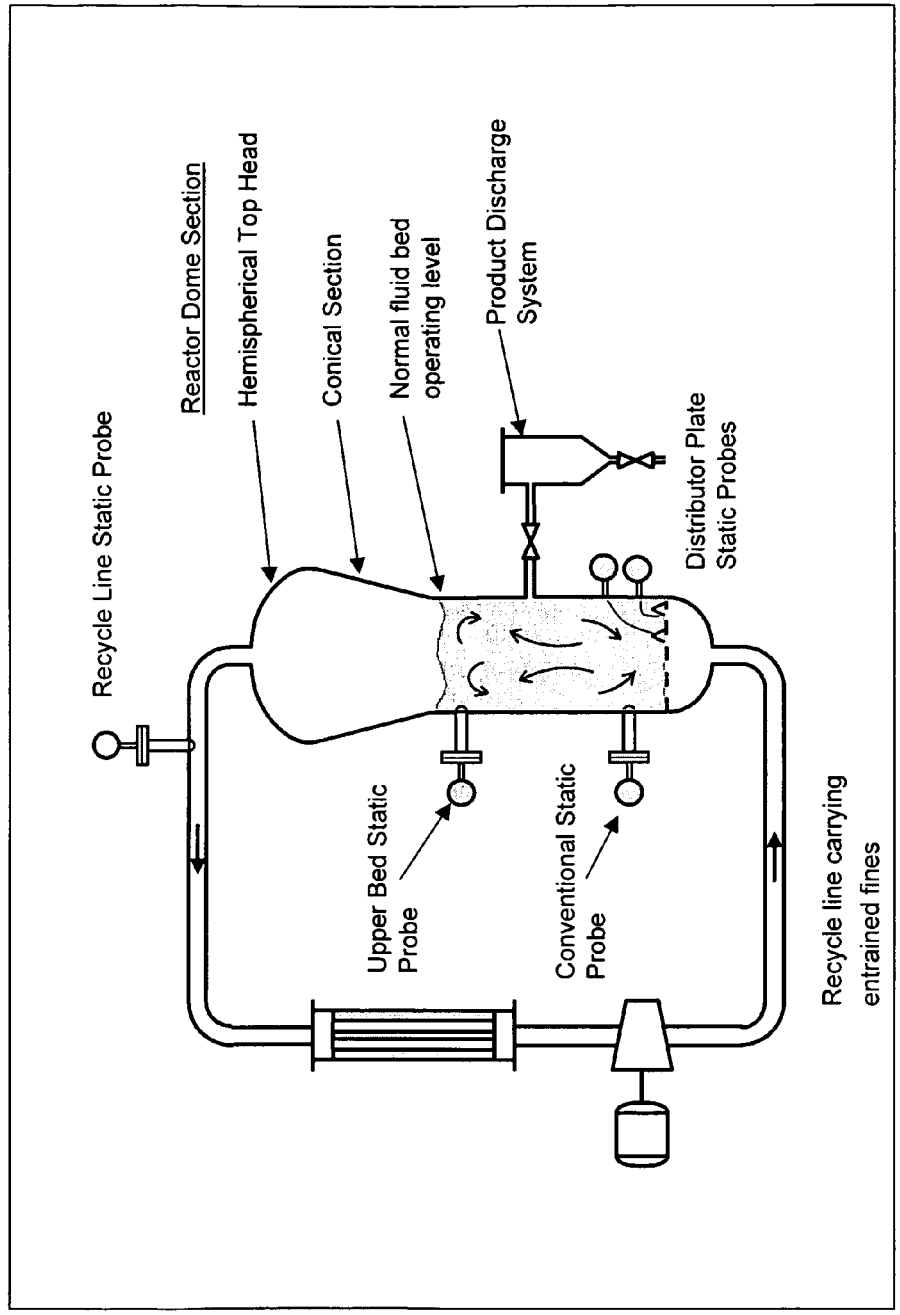
Figure 1 - Instrument Locations on Pilot-Scale Reactor

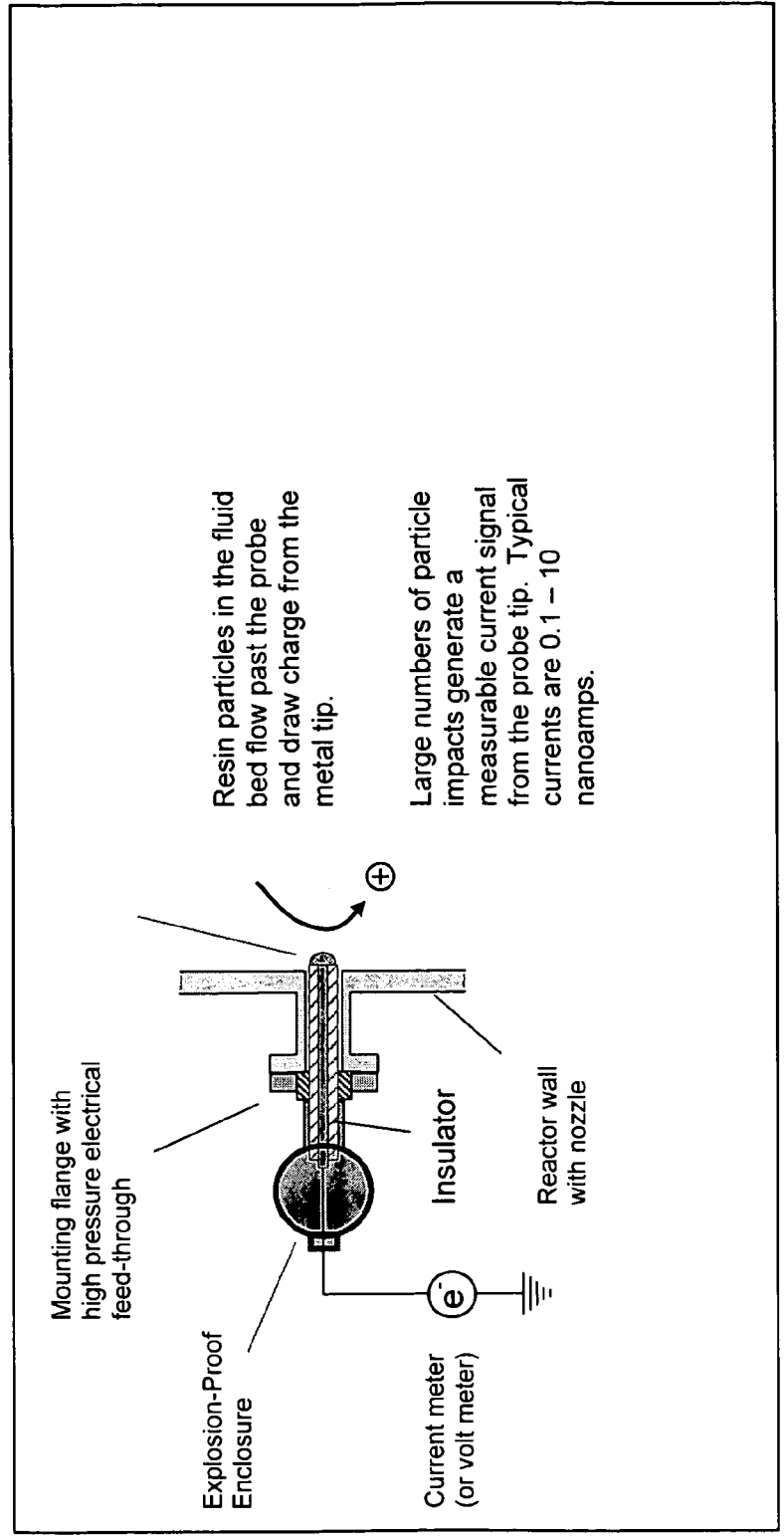
Figure 2 - Reactor Static Probe

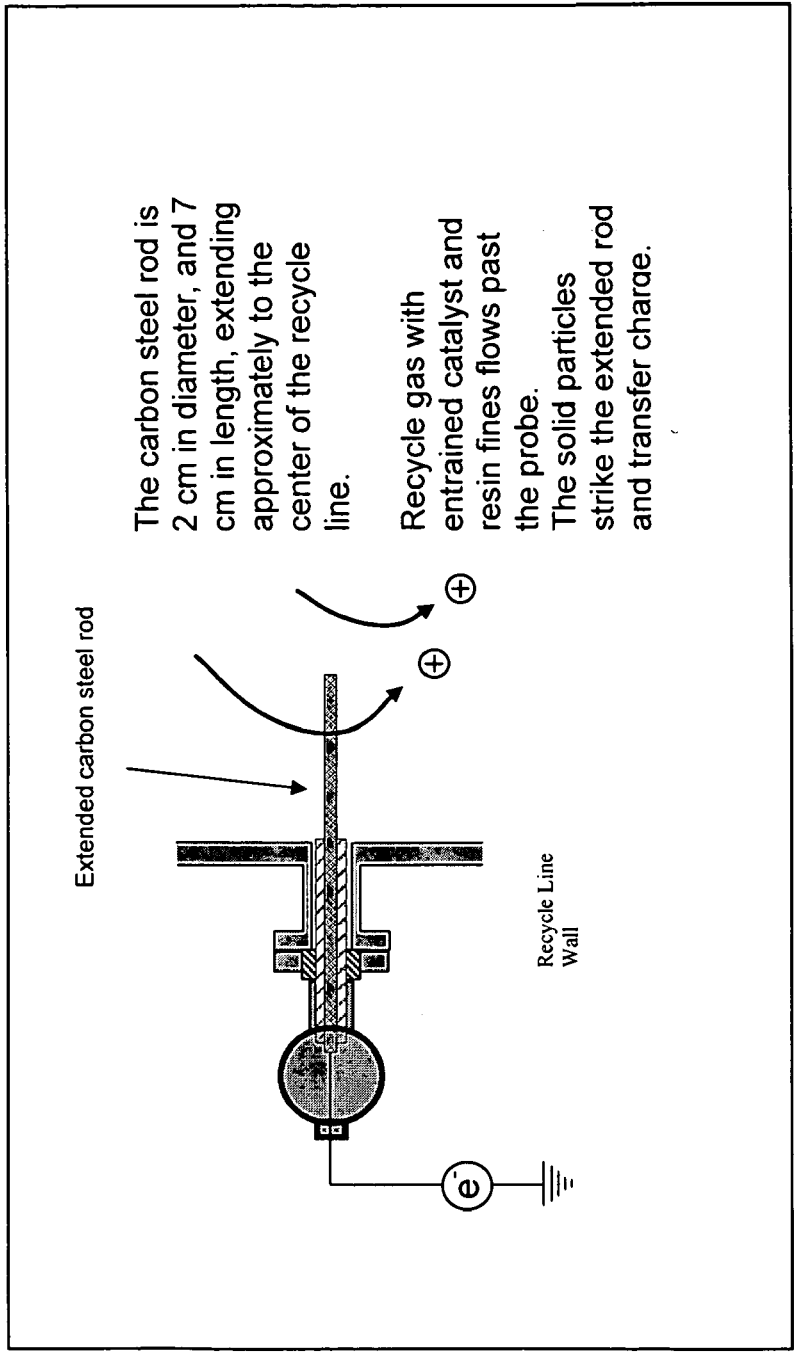
Figure 3 - Recycle Line Entrainment Static Probe

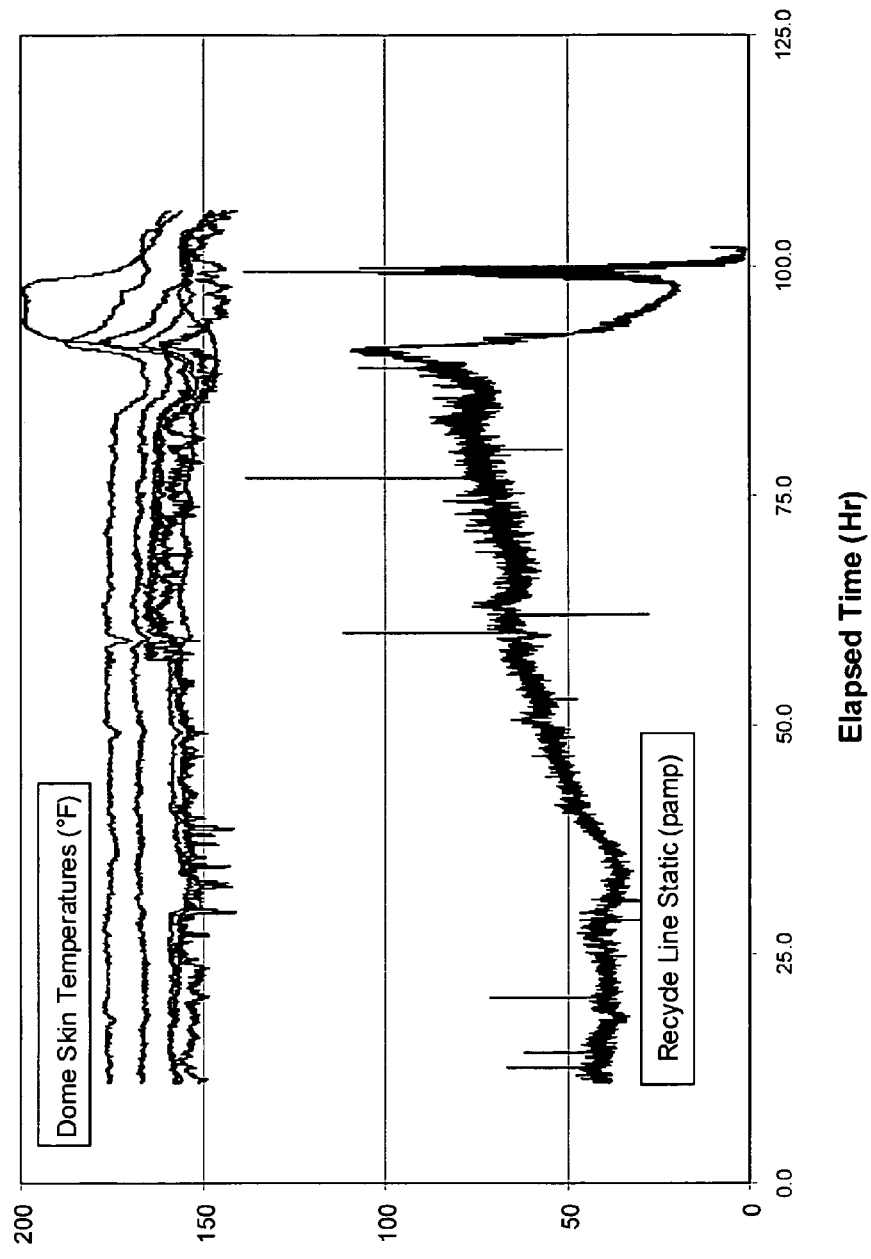
Figure 4 - XCAT EZ 100 Dome Sheeting Example

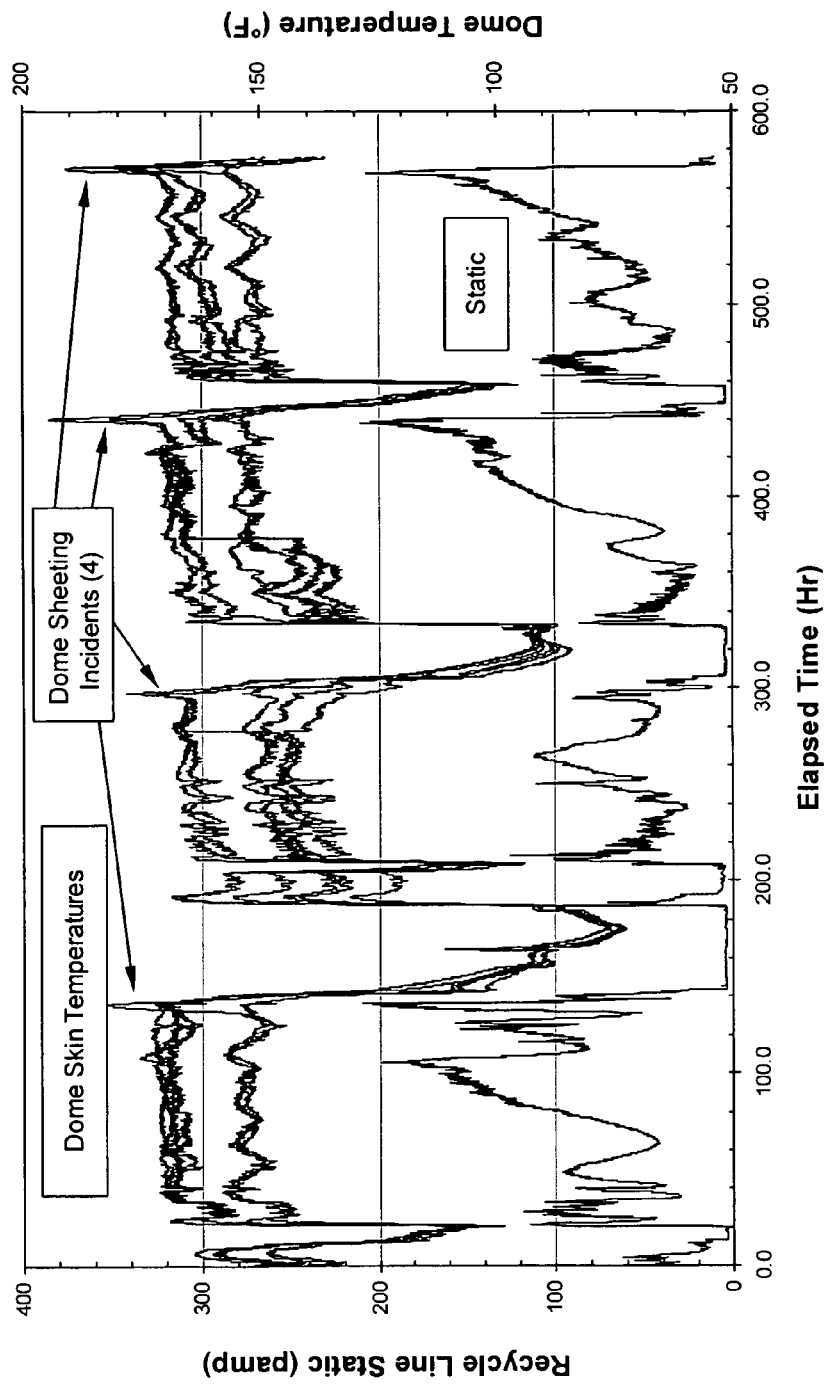
Figure 5 – Four Dome Sheeting Incidents with XCAT EZ 100

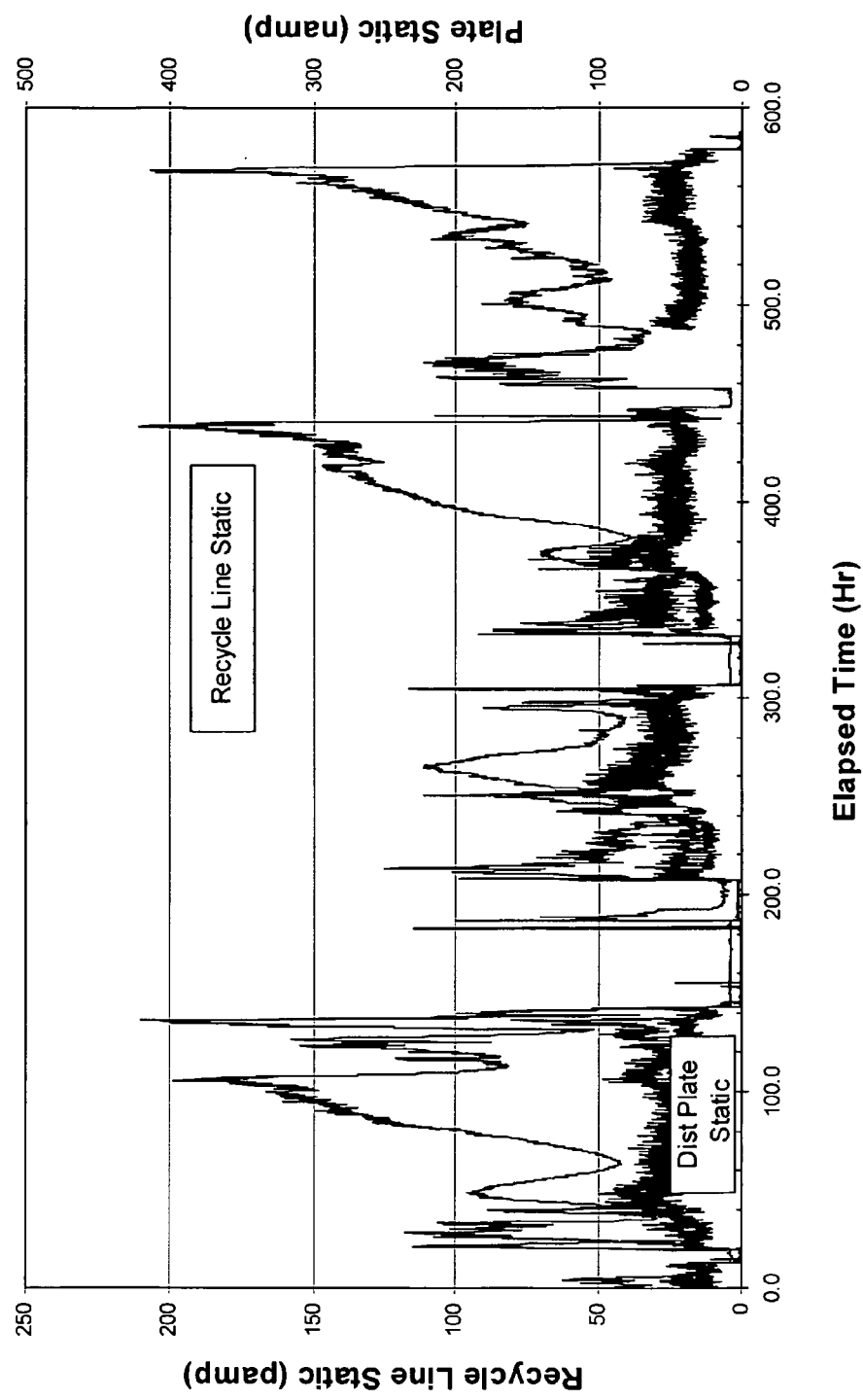
Figure 6 - Distributor Plate Static for XCAT EZ 100

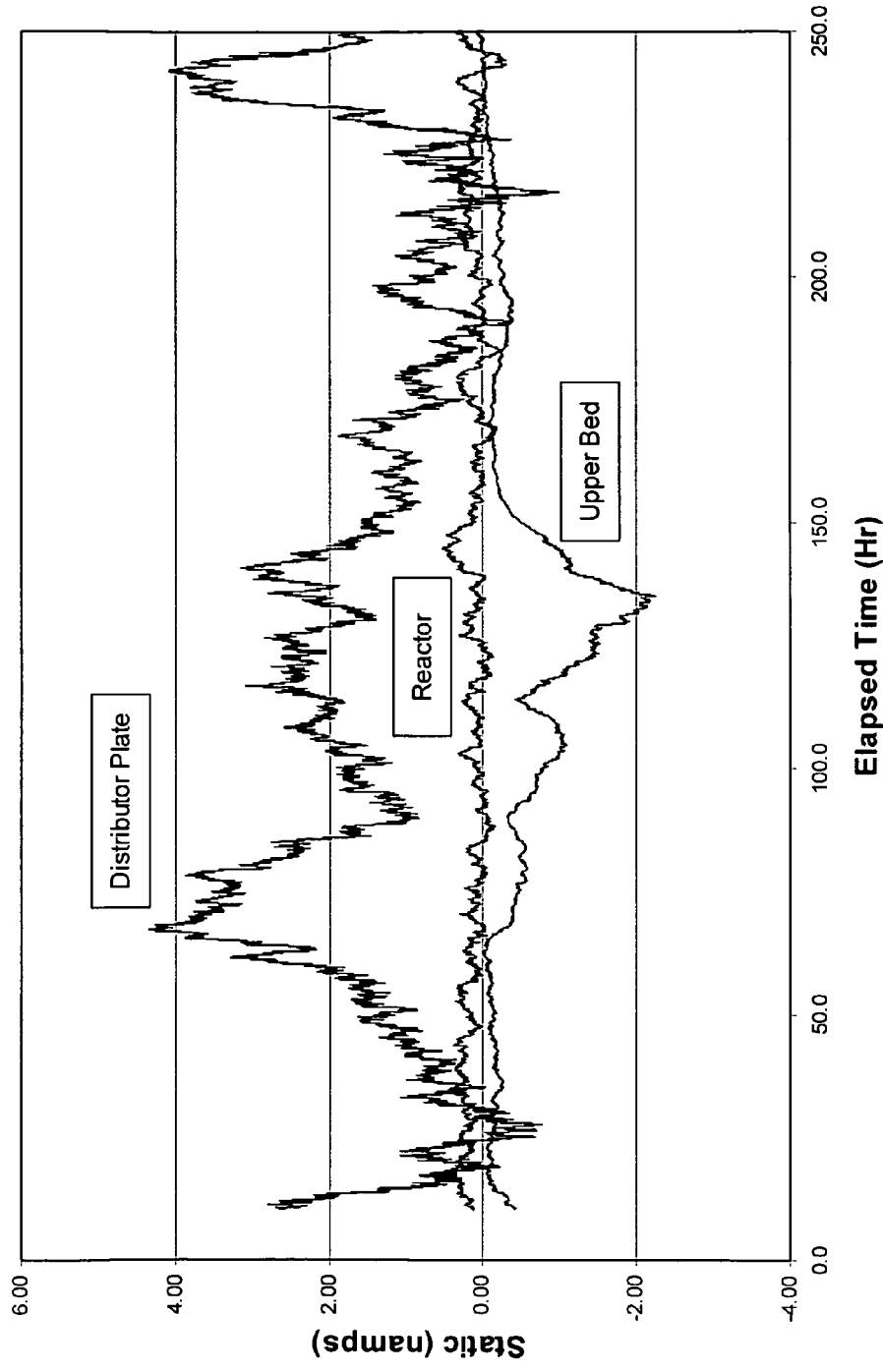
Figure 7 – Wall Sheeting Incident with XCAT HP 100

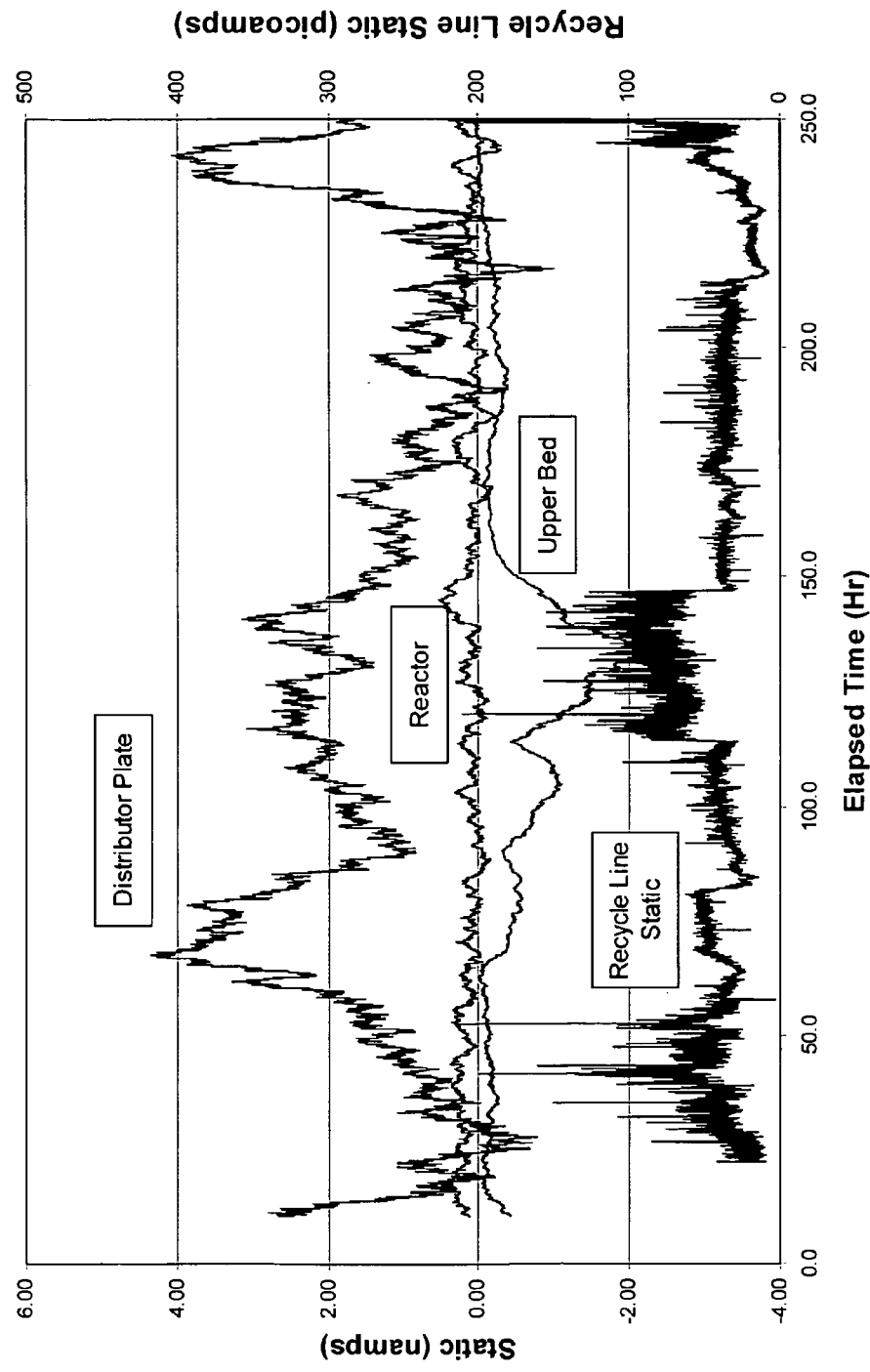
Figure 8 – Entrainment Static for Wall Sheeting Incident with XCAT HP 100

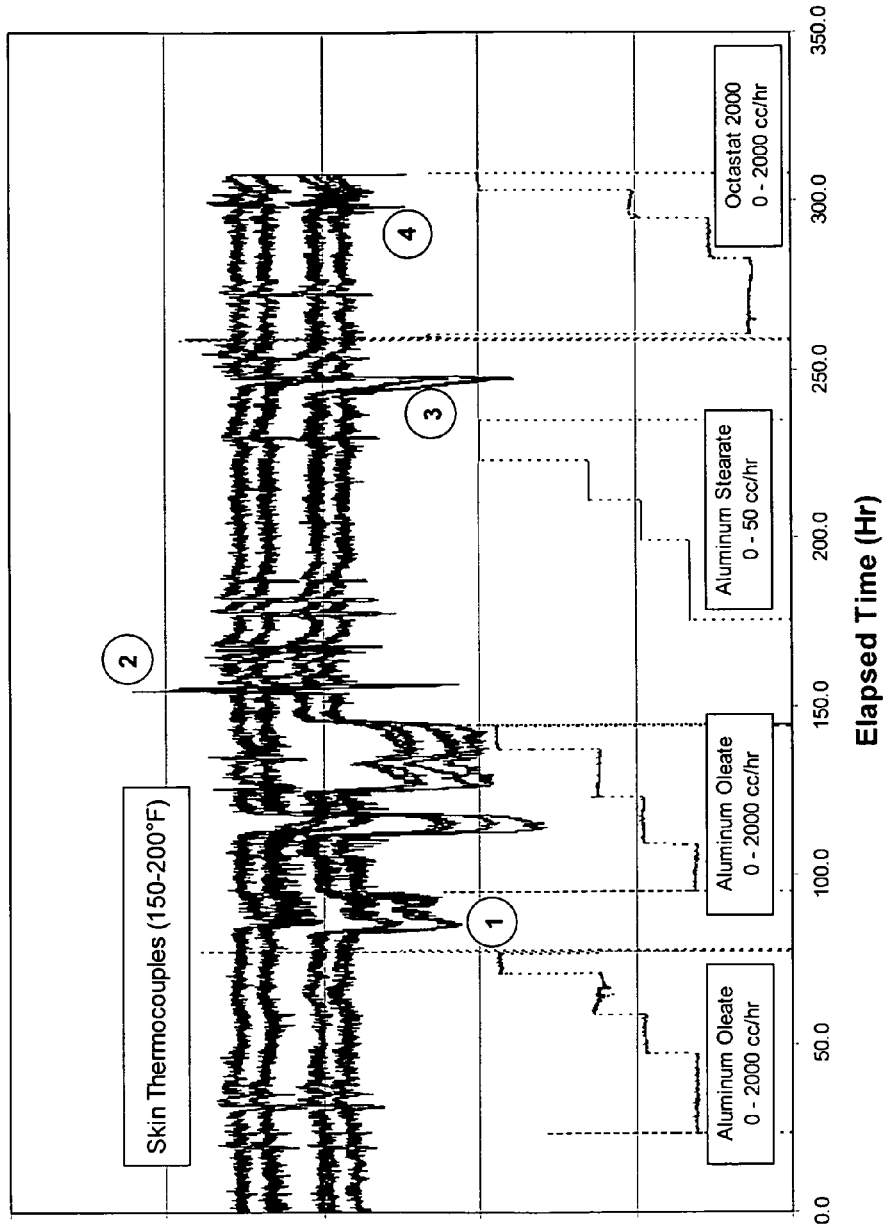
Figure 9 - Skin Temperatures and Additive Flow Rate for XCAT HP 100

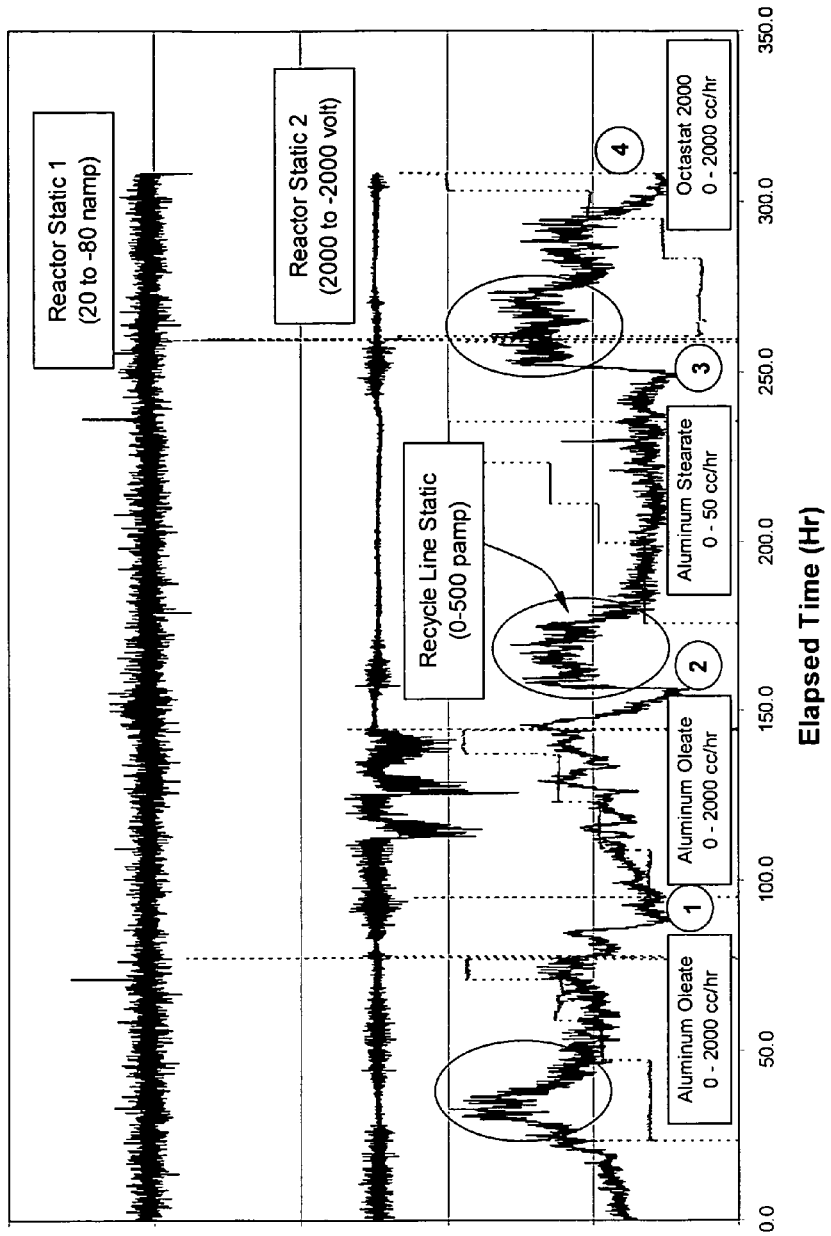
Figure 10 - Static Profile and Additive Flow Rate fro XCAT HP 100

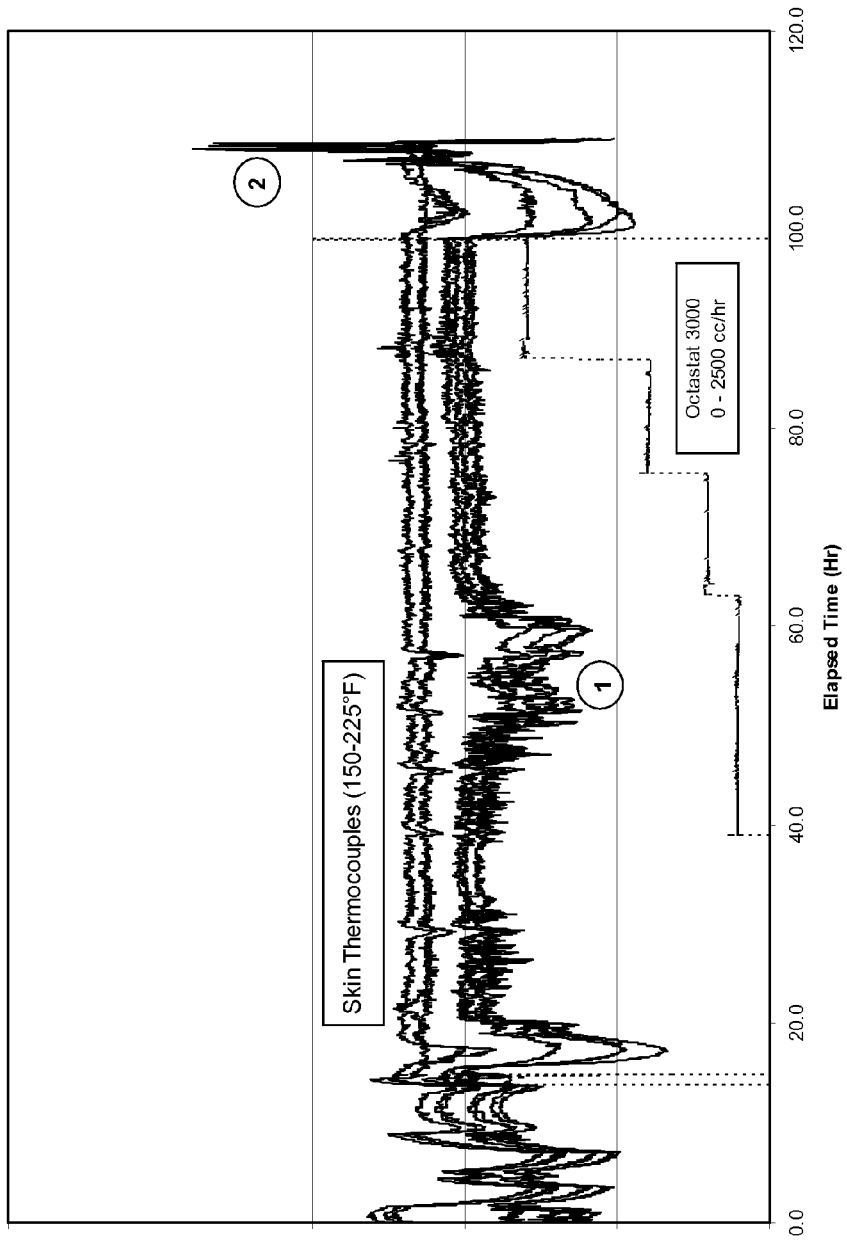
Figure 11 - Skin Temperatures Plot for OCTASTAT 3000 Using XCAT HP 100

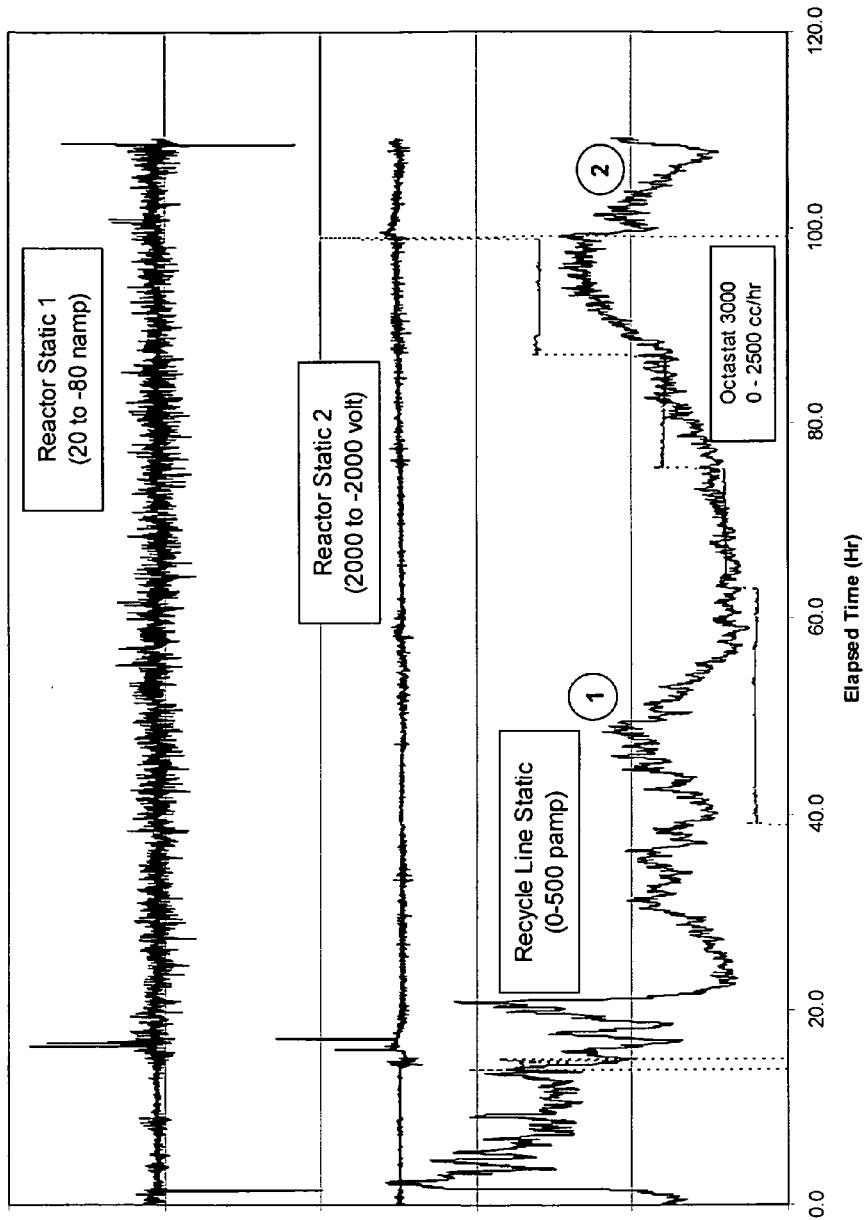
Figure 12 - Static Profile for OCTASTAT 3000 Using XCAT HP 100

METHOD FOR CONTROLLING SHEETING IN GAS PHASE REACTORS

CROSS-REFERENCE TO RELATED APPLICATION

This application is a continuation-in-part of Ser. No. 11/011,421, filed Dec. 14, 2004, now abandoned, which claims the benefit of Ser. No. 60/534,026, filed Jan. 2, 2004, the disclosures of which are herein incorporated by reference in their entireties.

TECHNICAL FIELD

Embodiments of this invention relate to measuring and controlling static in a gas phase polymerization reactor. In particular, embodiments of this invention relate to monitoring carryover static in new locations in the overall gas phase polymerization reactor, generally in polymerizations utilizing metallocene catalysts, to determine the onset of reactor discontinuity events such as chunking and sheeting. Embodiments of the invention also relate to monitoring carryover static in these new locations, to determine the need for addition of an effective amount of continuity additives that minimize reactor static activity, and in particular carryover static, and thereby preventing or minimizing such discontinuity events.

BACKGROUND

Sheeting and chunking has been a problem in commercial, gas phase polyolefin production reactors for many years. The problem is characterized by the formation of solid masses of polymer on the walls of the reactor. These solid masses or polymer (the sheets) eventually become dislodged from the walls and fall into the reaction section, where they interfere with fluidization, block the product discharge port, and usually force a reactor shut-down for cleaning, any one of which can be termed a "discontinuity event", which in general is a disruption in the continuous operation of a polymerization reactor. The terms "sheeting, chunking and/or fouling" while used synonymously herein, may describe different manifestations of similar problems, in each case they can lead to a reactor discontinuity event.

There are at least two distinct forms of sheeting that occur in gas phase reactors. The two forms (or types) of sheeting are described as wall sheets or dome sheets, depending on where they are formed in the reactor. Wall sheets are formed on the walls (generally vertical sections) of the reaction section. Dome sheets are formed much higher in the reactor, on the conical section of the dome, or on the hemi-spherical head on the top of the reactor (FIG. 1).

When sheeting occurs with Ziegler-Natta catalysts, it generally occurs in the lower section of the reactor and is referred to as wall sheeting. Ziegler-Natta catalysts are capable of forming dome sheets, but the occurrence is rare. But with metallocene catalysts, sheeting can occur in either location or both locations; that is, both wall sheeting and dome sheeting can occur.

Dome sheeting has been a particularly troublesome with metallocene catalyst systems. Typical metallocene compounds are generally described as containing one or more ligands capable of bonding to the transition metal atom, usually, cyclopentadienyl derived ligands or moieties, in combination with a transition metal selected from Group 4, 5 or 6 or from the lanthanide and actinide series of the Periodic Table of Elements.

One characteristic that makes it difficult to control sheeting with metallocene catalysts is their unpredictable static tendencies. For instance, EP 0 811 638 A2 describes metallocene catalysts as exhibiting sudden erratic static charge behavior that can appear after long periods of stable behavior.

As a result of the reactor discontinuity problems associated with using metallocene catalysts, various techniques have been developed that are said to result in improved operability. For example, various supporting procedures or methods for producing a metallocene catalyst system with reduced tendencies for fouling and better operability have been discussed in U.S. Pat. No. 5,283,218, which discloses the prepolymerization of a metallocene catalyst. U.S. Pat. Nos. 5,332,706 and 5,473,028 disclose a particular technique for forming a catalyst by "incipient impregnation." U.S. Pat. Nos. 5,427,991 and 5,643,847 disclose the chemical bonding of non-coordinating anionic activators to supports. U.S. Pat. No. 5,492,975 discloses polymer bound metallocene catalyst systems. U.S. Pat. No. 5,661,095 discloses supporting a metallocene catalyst on a copolymer of an olefin and an unsaturated silane. PCT publication WO 97/06186 discloses removing inorganic and organic impurities after formation of the metallocene catalyst itself. WO 97/15602 discloses readily supportable metal complexes. WO 97/27224 discloses forming a supported transition metal compound in the presence of an unsaturated organic compound having at least one terminal double bond.

Others have discussed different process modifications for improving reactor continuity with metallocene catalysts and conventional Ziegler-Natta catalysts. For example, WO 97/14721 discloses the suppression of fines that can cause sheeting by adding an inert hydrocarbon to the reactor. U.S. Pat. No. 5,627,243 discloses a distributor plate for use in fluidized bed gas phase reactors. WO 96/08520 discloses avoiding the introduction of a scavenger into the reactor. U.S. Pat. No. 5,461,123, discloses using sound waves to reduce sheeting. U.S. Pat. No. 5,066,736, and EP-A1 0 549 252, disclose the introduction of an activity retarder to the reactor to reduce agglomerates. U.S. Pat. No. 5,610,244, discloses feeding make-up monomer directly into the reactor above the bed to avoid fouling and improve polymer quality. U.S. Pat. No. 5,126,414, discloses including an oligomer removal system for reducing distributor plate fouling and providing for polymers free of gels. There are various other known methods for improving operability including coating the polymerization equipment, controlling the polymerization rate, particularly on start-up, and reconfiguring the reactor design and injecting various agents into the reactor.

With respect to injecting various agents into the reactor, the use of antistatic agents as process "continuity additives" appear to hold promise and have been the subject of various publications. For example, EP 0 453 116 A1, discloses the introduction of antistatic agents to the reactor for reducing the amount of sheets and agglomerates. U.S. Pat. No. 4,012,574, discloses adding a surface-active compound having a perfluorocarbon group to the reactor to reduce fouling. WO 96/11961, discloses an antistatic agent for reducing fouling and sheeting in a gas, slurry or liquid pool polymerization process as a component of a supported catalyst system. U.S. Pat. Nos. 5,034,480 and 5,034,481, disclose a reaction product of a conventional Ziegler-Natta titanium catalyst with an antistatic agent to produce ultrahigh molecular weight ethylene polymers. For example, WO 97/46599, discloses the use of soluble metallocene catalysts in a gas phase process utilizing soluble metallocene catalysts that are fed into a lean zone in a polymerization reactor to produce stereoregular polymers. WO 97/46599 also discloses that the catalyst feed-stream can contain antifoulants or antistatic agents such as ATMER® 163 (commercially available from ICI Specialty Chemicals, Baltimore, Md.).

U.S. Pat. No. 5,410,002, discloses using a conventional Ziegler-Natta titanium/magnesium supported catalyst system where a selection of antistatic agents are added directly to the reactor to reduce fouling. The amount of antistatic agent is described as depending on the granulometric distribution of the polymer or of the polymer being formed and one example of the antistatic agent is ATMER 163, but no method for dynamically adjusting or optimizing the amount of antistatic agent is disclosed.

U.S. Pat. No. 4,978,722, discloses a method for producing a propylene-alpha olefin block co-polymer in which one compound selected from the group consisting of an aromatic carboxylic acid ester, a phosphorous ester, an unsaturated dicarboxylic acid diester, a tertiary amine, and an amide are added to the gas phase of the polymerization reactor whereby the formation of low molecular weight polymer is suppressed and adhesion of polymer to the walls of the reactor is prevented. But there is no mention in U.S. Pat. No. 4,978,722 of measuring electrostatic activity nor is there any mention of a method to optimize the level of the compound that is added to prevent adhesion.

U.S. Pat. No. 5,026,795, discloses the addition of an antistatic agent with a liquid carrier to the polymerization zone in a gas phase polymerization reactor. Preferably, the antistatic agent is mixed with a diluent and introduced into the reactor by a carrier comprising the comonomer. The preferred antistatic agent disclosed is a mixture, which is marketed under the trademark STADIS® 450 by Octel Starreon and which contains a polysulfone, a polymeric polyamine, a sulfonic acid, and toluene. The amount of antistatic agent is disclosed to be very important. Specifically, there must be sufficient antistatic agent to avoid adhesion of the polymer to the reactor walls, but not so much that the catalyst is poisoned. U.S. Pat. No. 5,026,795 also discloses that the amount of the preferred antistatic agent is in the range of about 0.2 to 5 parts per million by weight (ppmw) of polymer produced; however, no method for optimizing the level of antistatic agent is disclosed based on measurable reactor conditions.

EP 0 811 638 A2, which is discussed above, discloses using a metallocene catalyst and an activating cocatalyst in a polymerization process in the presence of an antistatic agent, and also discloses the use of ATMER 163. EP 0 811 638 A2 also discloses various methods for introducing the antistatic agent, most preferably the antistatic agent is sprayed into the fluidized bed of the reactor. Another method generally disclosed is the addition of an antistatic agent with the supported or liquid catalyst stream so long as the catalysts are not severely affected or poisoned by the antistatic agent. EP 0 811 638 A2 includes examples in which the supported catalysts were slurried in mineral oil prior to being introduced to the reactor and the antistatic agent was introduced directly to the reactor when using the unsupported catalysts. Static was measured in the fluidized bed itself a few feet above the distributor plate. Preferably, the antistatic agent was added intermittently in response to a change such as a rising level of static electricity.

Although various methods have been developed to manage sheeting problems with metallocene catalysts and use of continuity additives has been investigated, the problem persists. One reason the problem persists is that the use of continuity additives can be accompanied by decreased catalyst efficiencies and productivities. Decreased catalyst efficiencies and catalyst productivities occur where additives injections are not matched precisely in regards to frequency and/or amount to arrest transient instances of reactor static, which can presage undesirable "reactor discontinuity events".

Another reason sheeting problems with metallocene catalysts persist (and perhaps is the root-cause of the problem) is the lack of advanced warning of such events (Note: EP 0 811 638 A2). Most sheeting incidents with metallocene catalysis have occurred with little or no advanced indication by any of the previously known and/or used process instruments, including the conventional static probes used heretofore. (Conventional static probes are those probes that are located, as discussed herein, and as discussed in U.S. Pat. No. 4,855, 370, ¼ to ¾ of a reactor diameter above the top of the distributor plate.) This lack of indication with conventional instruments by previously available measurable indicators has presented a significant challenge in efforts to troubleshoot and correct the sheeting problems (and the resultant reactor discontinuity) with metallocene catalyzed reactions.

One of the first descriptions of reactor sheeting was provided in U.S. Pat. No. 4,532,311. This patent was among the first to describe the important discovery that sheeting with Ziegler-Natta catalysts is the result of static electrification of the fluid bed. (not sure if it is a good idea to characterize the teachings unless it was explicit) A subsequent U.S. Pat. No. 4,855,370, combined the static probe of the '311 document with a means to control the level of static in the reactor. In the case of U.S. Pat. No. 4,855,370, the means to control static was water addition to the reactor (in the amount of 1 to 10 ppm of the ethylene feed). This process has proven effective for Ziegler-Natta catalysts, but has not been effective for metallocene catalyst reactions or reactors.

Understanding the causes of sheeting with metallocene catalysts has for many years been hampered by the lack of suitable instrumentation. In particular, the static probes (so called conventional static probes, located on the wall(s) of a reactor as noted above) used for Ziegler-Natta catalysts have not been effective for providing warning or notice of sheeting or chunking in metallocene catalyzed reactions and reactors utilizing such reactions. Wall and dome sheeting with metallocene catalysts usually occurs with no prior (or coincident) indication on the conventional reactor static probes. This can be seen in FIG. 7, which shows that there was virtually no response on the (conventional) reactor static probe(s) in a pilot plant prior to the wall sheeting incident with metallocene catalyst, compared to other static probe locations which did show a response (i.e. static above zero).

Thus, it would be advantageous to have a polymerization process utilizing metallocene catalysts, the process being capable of operating continuously with enhanced reactor operability (defined as the general absence of sheeting or chunks that might lead to reactor discontinuity events). It would also be highly advantageous to have a continuously operating polymerization process having more stable catalyst productivities and reduced fouling/sheeting tendencies based on readily measurable reactor conditions such as electrostatic activity at points in the reactor system, which need is answered by embodiments of the present invention.

SUMMARY

Among the contemplated embodiments of our invention is a process for monitoring the static generated during polymerization to avoid or minimize reactor discontinuity events comprising: measuring carryover static using one or more of at least one recycle line static probe, or at least one annular disk probe.

A further embodiment includes a process for introducing at least one continuity additive into a reactor system in an amount that prevents or reverses sheeting of polymer produced by a polymerization reaction of at least one olefin, wherein the polymerization reaction is conducted in the reactor system, the reactor system comprising a fluidized bed reactor, an entrainment zone, a catalyst feed for introducing a catalyst system capable of producing the polymer, a continuity additive feed for introducing the at least one continuity additive independently of the catalyst mixture, a means for monitoring levels of electrostatic activity in the entrainment zone, the process comprising: contacting the at least one olefin with the catalyst system under polymerization conditions in the fluidized bed reactor; introducing the continuity additive into the reactor system at anytime before, during, or after start of the polymerization reaction; monitoring the levels of electrostatic activity in the entrainment zone; and adjusting the amount of continuity additive introduced into the reactor system to maintain the levels of electrostatic activity in the entrainment zone at or near zero. In such a process the catalyst system comprises a metallocene or a conventional transition metal catalyst, the process may be a gas phase process, and the polymer is produced continuously, the monomers comprise ethylene or ethylene and one or more alpha-olefins. In the process the catalyst system comprises a metallocene catalyst system, wherein the means for measuring levels of electrostatic activity in the entrainment zone comprise one or more of at least one recycle line static probe, at least one annular disk probe, at least one distributor plate static probe or at least one upper reactor static probe. The at least one continuity additive comprises one or more compounds selected from the group consisting of alkoxylated amines, carboxylic acid salts, polysulfones, polymeric polyamines, sulfonic acids, or combinations thereof. Or the at least one continuity additive comprises ethoxylated stearyl amine, or the at least one continuity additive comprises aluminum stearate, or the at least one continuity additive comprises aluminum oleate. Or the at least one continuity additive comprises a mixture of 1 decene-polysulfone present in a concentration of 5 to 15 percent by weight of the mixture, a reaction product of N-tallow-1,3-diaminopropane and epichlorhydrin present in a concentration of 5 to 15 percent by weight of the mixture, dodecylbenzene sulfonic acid present in a concentration of 5 to 15 percent by weight of the mixture, and a hydrocarbon solvent in a concentration of 60 to 88 percent by weight of the mixture. The at least one continuity additive is introduced intermittently, and/or the at least one continuity additive is introduced as a slurry in a hydrocarbon liquid or as a solution in a hydrocarbon liquid. The at least one continuity additive may also be present in the catalyst mixture that is introduced into the reactor system via the catalyst feed, and the amount of the at least one continuity additive in the fluidized bed reactor is maintained at a concentration of 1 to 50 parts per million, based on the weight of the polymer produced in the fluidized bed reactor.

A further embodiment includes a polymerization process comprising: polymerizing ethylene and one or more alpha-olefins in the presence of one or more metallocene catalysts in a gas phase reactor; monitoring electrostatic activity in the gas phase reactor by a monitoring means; applying an effective amount of one or more continuity additives to the polymerization process responsive to the monitoring means measuring said electrostatic activity deviating from at or near zero, to return the electrostatic activity to at or near zero.

Another embodiment contemplated is a gas phase polymerization process, wherein electrostatic activity generated in an entrainment zone of a gas phase reactor is reduced or eliminated, comprising; polymerizing ethylene and one or more α-olefins in the presence of a metallocene catalyst system; measuring entrainment zone electrostatic activity using one or more of at least one recycle line static probe, at least one upper bed static probe, at least one annular disk static probe, or at least one distributor plate static probe, with the proviso that if the electrostatic activity measured by any one or more of the probes deviates from zero, one or more continuity additives is added to the gas phase reactor in an effective amount to reduce or eliminate the deviation from zero.

Another embodiment contemplated is a gas phase polymerization process comprising: polymerizing ethylene and one or more α-olefins in a gas phase reactor in the presence of a metallocene catalyst system; monitoring the electrostatic activity in the reactor the monitoring comprising one or more of at least one conventional static probe, at least one recycle line static probe, at least one upper bed static probe, at least one annular disk static probe, at least one distributor plate static probe, or combinations thereof; wherein the electrostatic activity measured by at least one of the at least one recycle line static probe, the at least one upper bed static probe, the at least one annular disk static probe, or the at least one distributor plate static probe is greater than ±0.5 nanoamps/cm$^2$ different from the electrostatic activity measured by the conventional static probe Another embodiment contemplated is a process for copolymerizing ethylene and one or more α-olefins in a gas phase reactor utilizing a metallocene catalyst, an activator and a support, comprising: combining ethylene and one or more of 1-butene, 1-hexene, or 1-octene in the presence of the metallocene catalyst, the activator and the support; monitoring carryover static in the reactor by one or more of at least one recycle line static probe, at least one upper bed static probe, at least one annular disk static probe, or at least one distributor plate static probe; maintaining the carryover static at or near zero by use of at least one continuity additive selected from one or more of alkoxylated amines, carboxylic acid salts, polysulfones, polymeric polyamines, sulfonic acids or combinations thereof, the at least one continuity additive present in the reactor from 10-40 ppm, based on the weight of a polymer produced by the polymerization.

In any of the embodiments described herein, the at least one static probe, and in its various embodiments, may be at least one bi-polar static probe.

In any of the embodiments described herein, the at least one static probe, and in its various embodiments, may measure current in the range of ±0-50 nanoamps/cm$^2$ or ±0.01-25 nanoamps/cm$^2$.

In any of the embodiments described herein, the at least one static probe, and in its various embodiments, may measure current in the range of ±0.01-25 nanoamps/cm$^2$.

In any of the embodiments described herein, the at least one static probe, and in its various embodiments, may measure current in the range of +0.01-20 nanoamps/cm$^2$.

In any of the embodiments described herein, the at least one static probe, and in its various embodiments, may measure current in the range of ±0.1-15 nanoamps/cm$^2$.

In any of the embodiments described herein, the at least one static probe, and in its various embodiments, may measure current in the range of ±0.1-10 nanoamps/cm$^2$.

DESCRIPTION OF THE DRAWINGS

FIG. 1 shows a schematic drawing of a typical gas phase reactor.

FIG. 2 shows an example of a conventional reactor static probe.

FIG. 3 shows an embodiment of the at least one recycle line static probe.

FIG. 4 shows an XCAT™ EZ 100 dome sheeting incident.

FIG. 5 shows four dome sheeting incidents with XCAT EZ 100.

FIG. 6 shows distributor plate static for XCAT EZ 100.

FIG. 7 shows wall sheeting incidents with XCAT™ HP 100.

FIG. 8 shows entrainment static for wall sheeting incidents with XCAT HP 100.

FIG. 9 shows skin temperature and additive flow rate for XCAT HP 100.

FIG. 10 shows the static profile and additive flow rate for XCAT HP 100.

FIG. 11 shows skin temperature plot for Octastat 3000® with XCAT HP 100.

FIG. 12 shows a static profile using Octastat 3000® with XCAT HP 100.

DESCRIPTION

We have surprisingly discovered that by changing the location of static activity actually measured (current per unit area is actually measured) in a polymerization reactor, we can detect and therefore prevent the onset of reactor discontinuity events, such as sheeting or chunking, especially for polymerizations with metallocene catalysts. Alternatively, we can stabilize or eliminate reactor discontinuity events, defined herein as sheeting, chunking or fouling. In particular, we have discovered that for gas phase polymerizations, significant static charging results from frictional contact between entrained catalyst particles and/or entrained resin particles (by entrained particles we intend those particles that are not contained in the dense phase zone of the reactor, and are therefore outside the fluid bed, as conventionally understood) against the walls and other metal components in the reactor recycle system. We have termed this static "carryover static". The persistent problem known for metallocene catalysts (where sheeting and chunking has not been known to be foretold by conventional reactor static probes) is now solved with the discovery of, and measurement of, carryover static in embodiments of the present invention. This carryover static can be monitored in locations discussed herein, and controlled using conventional means or techniques, which in turn will reduce, prevent or eliminate sheeting, chunking or fouling.

Frictional electrification (or triboelectrification) of solid particles is well known in the literature. In general, static charging can result whenever two dissimilar materials are brought into close contact. The dissimilar materials can be two different metals (conductors), two different insulators (a classic example being wool against an amber rod), or a conductor and an insulator. In the case of a gas phase polymerization reactor, static charging results from the frictional contact of polyethylene resin and catalyst particles (both insulators) against the carbon steel of the reactor wall (a conductor).

The basic driving force for frictional electrification is a difference in the two material's affinity for electrons. The material with the greater affinity gains electrons and becomes negatively charged, and the other looses electrons and becomes positively charged. In collisions of solid particles with the walls, piping or other metal parts of a polymerization reactor, the amount of charge transferred depends on the electrical properties of the metal and the particles, the degree of contact, the surface roughness, and other factors. Studies in the field of pneumatic conveying have indicated that triboelectrification of solid particles is also sensitive to the velocity of the conveying gas.

The amount of charge developed is also sensitive to any contamination that may exist on the surface of the reactor walls or other metal parts that come into contact with the solid particles. Charging is highly dependant on the characteristics of any resin coating that may exist of the internal surfaces of the reactor. In general, static charging is reduced when the walls are (desirably) coated with polyethylene of high electrical resistance.

It is known that electrostatic activity in polymerization reactor systems can be correlated to the formation of polymer sheets and/or fouling of the reactor by the polymer, and a resultant decrease or interruption in polymer production (a discontinuity event). Detection of and discussion of this electrostatic activity has generally been limited to the fluid bed portion of the reactor, i.e. the dense portion of the bed, generally above the distributor plate up to approximately ¾ of a reactor diameter distance above the distributor plate, or from ¼ to ¾ of a reactor diameter above the distributor plate. However, for metallocene catalysts in gas phase reactions, conventional, previously known static probes, often are not useful in predicting a reactor discontinuity event. Many times in a metallocene catalyzed reaction the conventional static probes show little or no electrostatic activity even during a sheeting event. Specifically, while one or more static probes in the entrainment zone of the reactor show electrostatic activity, which we now know is predictive of reactor discontinuity events, the conventional static probes frequently show little or no electrostatic activity. These problems are also known to vary over time during the course of the polymer production process. In embodiments of the present invention, the ability to monitor electrostatic charging (as measured by current/unit area) and to do so in the entrainment zone of the reactor not previously used to detect static charge, allows for dynamically adjusting the amount of the continuity additive that is used. That is, the amount of continuity additive is adjusted based on the level of electrostatic activity in the reactor system as detected by one or more of the non-conventional, entrainment zone static probes. The terms electrostatic activity, electrostatic charging, and static, are used interchangeably herein. When electrostatic activity in the entrainment zone is discussed, it is also represented by "carryover static"

The entrainment zone is defined as any area in a reactor system above or below the dense phase zone of the reactor system. Fluidization vessels with a bubbling bed comprise two zones, a dense bubbling phase with an upper surface separating it from a lean or dispersed phase. The portion of the vessel between the (upper) surface of the dense bed and the exiting gas stream (to the recycle system) is called "freeboard". Therefore, the entrainment zone comprises the freeboard, the cycle (recycle) gas system (including piping and compressors/coolers) and the bottom of the reactor up to the top of the distributor plate. Electrostatic activity measured anywhere in the entrainment zone is termed herein "carryover static", and as such, is differentiated from the electrostatic activity measured by a conventional static probe or probes in the fluid bed.

We have surprisingly discovered that the electrostatic activity (carryover static) measured above the "at or near zero" level (as defined herein) on the carryover particles in the entrainment zone correlates with sheeting, chunking or the onset of same in a polymer reaction system and is a more correlatable indicator of sheeting or a discontinuity event than electrostatic activity measured by one or more "conventional" static probes. In addition, monitoring electrostatic activity of the carryover particles in the entrainment zone has been found to provide reactor parameters by which the amount of continuity additive can be dynamically adjusted and an optimum level obtained to reduce or eliminate the discontinuity event.

If the level of electrostatic activity in the entrainment zone increases in magnitude during the course of the reaction, the amount of continuity additive in the reactor system can be adjusted accordingly as described further herein.

Static Probes

The static probes described herein as being in the entrainment zone include one or more of: at least one recycle line probe; at least one annular disk probe; at least one distributor plate static probe; or at least one upper reactor static probe, this latter will be outside or above the ¼ to ¾ reactor diameter height above the distributor plate of the conventional probe or probes. These probes may be used to determine entrainment static either individually or with one or more additional probes from each group mentioned above. FIG. 1 shows some of the general locations of the instruments used in embodiments of the present invention. The instruments include a conventional static detector or detectors in the fluid bed ("conventional reactor static probe") as described herein.

FIG. 2 shows an example of a conventional reactor static probe. This probe or probes measure the electric current that flows from a probe tip as a result of particle impacts (by the catalyst and/or resin). The measured current (per unit area) from the probe tip provides an estimate of the charge transfer that is occurring on the reactor wall as a whole. The probe tips effectively represent pieces of the reactor wall that have been instrumented to measure the charge flow. The probe tips for these detectors as well as all other probes discussed herein, may be made of any conductor, including carbon steel, iron, stainless steel, titanium, platinum, nickel, Monel® alloy, copper, aluminum, or they may be bi-metallic with one metal forming a core the other forming a skin or veneer. Further description of conventional static probes is provided in U.S. Pat. No. 6,008,662.

Typical current levels measured with the conventional reactor probes range from ±0.1-10, or ±0.1-8, or ±0.1-6, or ±0.1-4, or ±0.1-2 nanoamps/cm$^2$. As with all current measurements discussed herein, these values will generally be averages over time periods also discussed herein, also these may represent root mean squared values (RMS), in which case they would all be positive values. However, most often, in reactors utilizing metallocene catalysts, the conventional reactor probes will register at or near zero during the beginning of or middle of a sheeting incident. By at or near zero, we intend for either the conventional static reactor probe as well as the probes in the entrainment zone, to be a value of $\leq \pm 0.5$, or $\leq \pm 0.3$, or $\leq \pm 0.1$, or $\leq \pm 0.05$, or $\leq \pm 0.03$, or $\leq \pm 0.01$, or $\leq \pm 0.001$ or 0 nanoamps/cm$^2$. For example, a measured value of −0.4 would be "less than" "±0.5", as would a measured value of +0.4.

As noted elsewhere herein, the conventional static probe may register at or near zero static or current (as defined herein), while at least one other static probe in at least one location in the entrainment zone, may register static activity or current higher than that measured by the conventional static probe (this latter may most often be at or near zero with metallocene catalyst). In this event, where the difference between the current measured by conventional static probe and the current measured by one or more other (non-conventional static probes) is $\geq \pm 0.1$, or $\geq \pm 0.3$, or $\geq \pm 0.5$ nanoamps/cm$^2$, or greater, action will be taken to reduce or eliminate the static charge in being detected at one or more of the entrainment zone probes. Such action may be addition of at least one continuity additive (or a net increase in the presence in the reactor of at least one continuity additive), or a reduction in the catalyst feed rate, or a reduction in the gas throughput velocity, or combinations thereof. These actions constitute means for maintaining, reducing or eliminating carryover static and reactor static at or near zero.

Recycle Line Static Probe

The at least one recycle line static probe, may be located in any part of the recycle line from the inlet of the recycle line at the top of the reactor to the outlet of the recycle line into the bottom of the reactor. This will include from the recycle line inlet at the top of the reactor to the cooler or compressor (which may be interchanged spatially with one another), between the cooler and compressor, after the cooler or compressor, between the cooler or compressor and the recycle line outlet at the bottom of the reactor. With the at least one recycle line static probe, and we contemplate 1, 2, 3, 4, 5, 6, 7, 8, 9, or more of these recycle line static probes in one or more locations.

FIG. 3 shows an embodiment of the at least one recycle line static probe. The probe tip in this embodiment may be a carbon steel rod (or other materials as discussed herein) and may extend approximately to the center of the recycle line. Further, the at least one recycle line probe may be located at any angle with or perpendicular to, the recycle line wall. Further, the at least one recycle line probe may extend into the recycle line from 0.1-0.9D, or 0.2-0.8D, or 0.3-0.7D, or 0.4-0.6D, or 0.5D, where D is the inside diameter of the recycle line. As recycle gas and entrained solid particles (resin and/or catalyst/support particles) flow past the probe, some of the solid particles strike the rod and transfer charge. Current from the at least one recycle line static probe may be ±0-50 nanoamps/cm$^2$, or ±0.01-25, or ±0.01-20, or ±0.1-15, or ±0.1-10, or ±0.1-7.5, or ±0.1-5.0, or ±0.1-2.5, or ±0.1-1.5, or ±0.1-1.0 nanoamps/cm$^2$.

Annular Disk Static Probe

The at least one annular disk static probe may be located in any position on or horizontal to the annular disk that provides access to the flowing stream of gas, and/or liquids and/or entrained solid particles that pass (at relatively high speed) through the annular opening. The tip of the probe may project into the annular opening for a distance of 0.1-0.9D, or 0.2-0.8D, or 0.3-0.7D, or 0.4-0.6D, or 0.5D, where D is the inside diameter of the annular disk. We contemplate 1, 2, 3, 4, 5, 6, 7, 8, 9, 10 or more of these annular disk static probes. The probe tip must be mounted by insulating material so as to prevent electrical contact between the probe tip and the metal surfaces of the annulus (and the reactor walls). Current from the at least one annular disk static probe may be ±0-50 nanoamps/cm$^2$, or ±0.01-25, or ±0.01-20, or ±0.1-15, or ±0.1-10, or ±0.1-7.5, or ±0.1-5.0, or ±0.1-2.5, or ±0.1-1.5, or ±0.1-1.0 nanoamps/cm$^2$.

Upper Bed Static Probe

The at least one upper bed static probe may be located higher in the reactor than the upper limit of a conventional static probe (a distance above the distributor plate equal to ¾ times the reactor diameter) or generally at least a distance equal to 0.8, or 0.9, or 1.0 times the diameter of the reactor and above, and up to the point where the vertical walls of the reactor meet the conical section of the reactor. We contemplate 1, 2, 3, 4, 5, 6, 7, 8, 9, 10 or more of these upper bed static probes. Current from the at least one upper bed static probe may be ±0-50 nanoamps/cm$^2$ or ±0.01-25, or ±0.01-20, or ±0.1-15, or ±0.11-10, or ±0.1-7.5, or ±0.1-5.0, or ±0.1-2.5, or ±0.11-1.5, or ±0.11-1.0 nanoamps/cm$^2$.

Distributor Plate Static Probe

The at least one distributor plate static probe, also referred to as a distributor plate cap, represents another means of measuring the carryover static. The at least one distributor plate probe comprises a metal cap placed above one or more of the holes in the distributor plate. The caps are insulated from the plate and connected to a current meter by means of an electrical conduit. The at least one probe measures current transfer due to the impact of catalyst and/or resin fines on the metal cap or caps. The distributor plate static probes (caps) may be constructed of carbon steel or other conductors, as noted above, to simulate the charge transfer that occurs with all of the other (non-instrumented) caps on the distributor plate. Ideally, these distributor plate probes (caps) are constructed from the same material as the distributor plate and caps. Additional details of a distributor plate static probe useful for measuring carryover static are provided in US Publication 20040132931, published Jul. 8, 2004, entitled "Static Measurement and Detection in a Gas Phase Polyethylene Reactor", filed Dec. 26, 2002. We contemplate 1, 2, 3, 4, 5, 6, 7, 8, 9, 10 or more of these distributor plate static probes. Current measured in the at least one distributor plate probe may range from ±0-50 nanoamps/cm$^2$ or ±0.01-25, or ±0.01-20, or ±0.1-15, or ±0.1-10, or ±0.1-7.5, or ±0.1-5.0, or ±0.1-2.5, or ±0.1-1.5, or ±0.1-1.0 nanoamps/cm$^2$.

Any one of these static probes in any location in the entrainment zone may function as the static probe that is determinative of the beginning of or existence of a reactor discontinuity event, or one or more in each location (recycle line, annular disk, upper bed and/or distributor plate static probes) may be used in conjunction with one or more in another location to be so determinative. The static probes may also function separately, that is, if one probe in one location begins to register static activity action may be taken (as noted herein below) to reduce or eliminate the charge by introduction of continuity additive or in the case where one or more continuity additives are already in the reactor, for instance due to being fed with the catalyst, then additional continuity additives may be added, generally through another feed than the catalyst feed.

Means for monitoring electrostatic activity in the reactor system are provided by static probes as known in the art or described herein. Such static probes include a metallic probe tip, one or more signal wires, an electrical feed-through, and a measuring instrument. The probe tip may comprise a cylindrical rod, but could be any cross sectional form such as square, rectangular, triangular, or oblong. With respect to material, the probe tip may be any conductor, as discussed herein. With respect to the signal wires, any conventional insulated wire may be used. With respect to the electrical feed-through, any suitable feed-through may be used as long as it provides the necessary electrical isolation from ground (and the reactor walls), and provides the required pressure seal to prevent leakage of high pressure reactor gases from the reactor. Suitable electrical feed-throughs are available commercially from Conax Buffalo Corp. and other suppliers.

With respect to monitoring the readings from the static probes, any instrument or device capable of measuring the flow of current from the probe tip to ground may be used. Suitable instruments include an ammeter, a picoammeter (a high sensitivity ammeter), a multi-meter, or electrometer. The flow of current may also be determined monitored indirectly by measuring the voltage generated by the current in passing through a series resistor. The current in this case would be determined from the measured voltage by through Ohm's Law, $I=V/R$, where I is the current (in amperes), V is the measured voltage (in volts) and R is the resistance (in Ohms). As indicated in U.S. Pat. No. 6,008,662, the value of the series resistor may be from 1 ohm to $4\times10^{11}$ ohms, without substantially affecting the value of the current reading obtained.

Methods of Processing Current Level

Those of skill in the art will recognize that there may be many methods of processing the current signals from the static probes. These methods include simple weighted averaging, with periods of averaging from 10 milliseconds to 10 hours, or 10 seconds to 10 hours, or 30 seconds to 5 hours, or 1 minute to 1 hour, or 1 minute to 2 hour, or 1 minute to 10 minutes. Additionally or alternatively, the signal may be processed to provide a root mean squared (RMS) derivative of the basic current signal, a standard deviation of the basic current signal, an absolute value of the basic current signal, or an average of the absolute value of the basic current signal (using the averaging periods described above).

Continuity Additive

When one or more of the static probes discussed immediately above begin to register static activity above or below zero, (defined as being respectively above or below "at or near zero") measures should be taken to keep the level low or to return the level of static activity to at or near zero, which we have shown will prevent, reduce or eliminate reactor continuity events. The measures contemplated include addition of one or more continuity additives. Such addition may have the effect of raising the level of continuity additive in the reactor if a certain level is already present. The total amount of continuity additive or additives to be present in the reactor will generally not exceed 250 or 200, or 150, or 125 or 100 or 90, or 80, or 70, or 60, or 50, or 40, or 30, or 20 or 10 ppm (parts per million by weight of polymer being produced) and/or the amount of continuity additive will be zero, or greater than 1, or 3, or 5, or 7, or 10, or 12, or 14, or 15, or 17, or 20 ppm based on the weight of polymer being produced (usually expressed as pounds or kilograms per unit of time). Any of these lower limits are combinable with any upper limit. These amounts of continuity additive contemplate one, two, three, four or more continuity additives, the total amount of one or two or more continuity additives in the reactor will be understood to be additive with the total disclosed immediately above from any source. The continuity additive can be added directly to the reactor through a dedicated feed line, and/or added to any convenient feed stream, including the ethylene feed stream, the comonomer feed stream, the catalyst feed line, or the recycle line. If more than one continuity additive is used, each one may be added to the reactor as separate feed streams, or as any combination of separate feed streams or mixtures. The manner in which the continuity additives are added to the reactor is not important, so long as the additive(s) are well dispersed within the fluidized bed, and that their feed rates (or concentrations) are regulated in a manner to provide minimum levels of carryover static as discussed supra.

We contemplate that the total amount of continuity additive discussed immediately above can include continuity additive from any source, such as that added with the catalyst, that added in a dedicated continuity additive line, that contained in any recycle material, or combinations thereof. In one embodiment, a portion of the continuity additive(s) would be added to the reactor as a preventative measure before any measurable electrostatic activity, in such case, when one or more static probes register static activity above the "at or near zero" level, the continuity additive will be increased to return the one or more probes registering static activity, back to at or near zero.

It is also within the scope of embodiments of the present invention to introduce at least one continuity additive in the catalyst mixture, inject the catalyst mixture (containing at least one continuity additive) into the reactor system, and additionally or alternatively introduce at least one continuity additive into the reactor system via a dedicated continuity additive feed line independent of the catalyst mixture, so that a sufficient concentration of the at least one continuity additive is introduced into the reactor to prevent or eliminate a reactor discontinuity event. Either of these feed schemes or both together may be employed. The continuity additive in the catalyst/continuity additive mixture and the continuity additive added via the separate continuity additive feed line, may be the same or different.

Determination of optimal continuity additive feed rate to the reactor system is evidenced by a value of the carryover static at or near zero as defined herein. For example, after stabilizing the carryover static reading in the reactor, if additional (i.e. higher) levels of continuity additive are added, and if one or more static probes in the entrainment zone of the reactor shows an increase in magnitude of static reading, this is a qualitative indication that the optimum continuity level has been exceeded. In this event, the levels of continuity additive should be lowered until stability of the static activity (as indicated by relatively constant readings of static activity in the one or more static probes) is again achieved, or the static activity is lowered to near zero or regains zero. Thus, dynamically adjusting the amount of continuity additive to reach an optimum concentration range is desirable and is within the practice of embodiments of the present invention. By optimum concentration we intend herein an effective amount. Therefore, an effective amount of at least one continuity additive is that amount that reduces, eliminates or achieves stability in electrostatic charge as measured by one or more static probes. Thus, as noted herein, if too much continuity additive is added, electrostatic charge will reappear; such an amount of continuity additive will be defined as outside an effective amount.

Suitable continuity additives for use in the present invention comprise one or more compounds selected from alkoxylated amines, carboxylic acid salts, polysulfones, polymeric polyamines, and sulfonic acids.

The continuity additive may comprise ethoxylated stearyl amine. Ethoxylated stearyl amine that is commercially available from ICI and its affiliates, is supplied under the trademark ATMER 163 and another that is commercially available from Witco Chemical Company is supplied under the trademark AS 990.

Other suitable continuity additives include aluminum stearate and aluminum oleate. Still other suitable continuity additives are supplied commercially under the trademarks OCTASTAT and STADIS (these are believed to be the same or similar chemical substance) and/or are described in U.S. Pat. No. 5,026,795 and are available from Octel Starreon.

In another embodiment, the continuity additive may be a mixture of 2 or more of the above discussed continuity additives. Such mixtures may include: alkoxylated amines and carboxylic acid salts; or alkoxylated amines and polysulfones; or alkoxylated amines and polymeric polyamines; or alkoxylated amines and sulfonic acids; or carboxylic acid salts and polysulfones; or carboxylic acid salts and polymeric polyamines; or carboxylic acid salts and sulfonic acids; or polysulfones and polymeric polyamines; or polysulfones and sulfonic acids; or polymeric polyamines and sulfonic acids. Additionally, we contemplate alkoxylated amines, carboxylic acid salts and polysulfones; or alkoxylated amines, polymeric polyamines and sulfonic acids; or carboxylic acid salts, polysulfones and polymeric polyamines; or carboxylic acid salts, sulfonic acids and polysulfones; alkoxylated amines, carboxylic acid salts and polymeric polyamines; alkoxylated amines, carboxylic acid salts and sulfonic acids; alkoxylated amines, polysulfones and sulfonic acids; alkoxylated amines, polymeric polyamines and polysulfones; polysulfones, polymeric polyamines and sulfonic acids; carboxylic acid salts, polymeric polyamines and sulfonic acids. Combinations of four or more of these continuity additives are also contemplated. These combinations may be combined at ratios of from 10:90 to 90:10, or 25:75 to 75:25, or 40:60 to 60:40, or 50:50, or in the case of three continuity additives, 10:10:80 to 80:10:10 or 10:80:10. The absolute amount of these continuity additives is as noted above.

Another continuity additive for use in embodiments of the present invention comprises a mixture of 1 decene-polysulfone present in a concentration of 5-15 percent by weight of the mixture, a reaction product of N-tallow-1,3-diaminopropane and epichlorohydrin present in a concentration of 5-15 percent by weight of the mixture, dodecylbenzenesulfonic acid present in a concentration of 5-15 percent by weight of the mixture, and a hydrocarbon solvent in a concentration of 60-88 percent by weight of the mixture, this mixture is commercially available from Octel Starreon and its affiliates under the trademark OCTASTAT 3000 (which may also be available as STADIS 450) or OCTASTAT 2000 (which may also be available as STADIS 425), each of which may have a different percentage makeup than that discussed immediately above.

If a combination of continuity additives is used, the total present in the reactor will be as noted above.

Catalysts

All polymerization catalysts including conventional transition metal catalysts and metallocene catalysts or combinations thereof, are suitable for use in embodiments of the processes of the present invention. Also contemplated are catalysts such as $AlCl_3$, cobalt, iron, palladium, chromium/chromium oxide or "Phillips" catalysts. The following is a non-limiting discussion of the various polymerization catalysts useful in the invention.

GENERAL DEFINITIONS

As used herein, the phrase "catalyst system" includes at least one "catalyst component" and at least one "activator", alternately at least one cocatalyst. The catalyst system may also include other components, such as supports, and is not limited to the catalyst component and/or activator alone or in combination. The catalyst system may include any number of catalyst components in any combination as described herein, as well as any activator in any combination as described herein.

As used herein, the phrase "catalyst compound" includes any compound that, once appropriately activated, is capable of catalyzing the polymerization or oligomerization of olefins, the catalyst compound comprising at least one Group 3 to Group 12 atom, and optionally at least one leaving group bound thereto.

As used herein, the phrase "leaving group" refers to one or more chemical moieties bound to the metal center of the catalyst component that can be abstracted from the catalyst component by an activator, thus producing the species active towards olefin polymerization or oligomerization. The activator is described further below.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press $81^{st}$ ed. 2000).

As used herein, a "hydrocarbyl" includes aliphatic, cyclic, olefinic, acetylenic and aromatic radicals (i.e., hydrocarbon radicals) comprising hydrogen and carbon that are deficient by one hydrogen. A "hydrocarbylene" is deficient by two hydrogens.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, and thioethers.

As used herein, "heterocyclic" refers to ring systems having a carbon backbone that comprise from 1 to 3 atoms selected from the group consisting of boron, aluminum, silicon, germanium, nitrogen, phosphorous, oxygen and sulfur, unless the heteroatom (non carbon atom) is described.

As used herein, an "alkylcarboxylate", "arylcarboxylate", and "alkylarylcarboxylate" is an alkyl, aryl, and alkylaryl, respectively, that possesses a carboxyl group in any position. Examples include $C_6H_5CH_2C(O)O^-$, $CH_3C(O)O^-$, etc.

As used herein, the term "substituted" means that the group following that term possesses at least one moiety in place of one or more hydrogens in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

Unless stated otherwise, no embodiment of the present invention is herein limited to the oxidation state of the metal atom "M" as defined below in the individual descriptions and examples that follow.

Metallocene Catalyst Component

The catalyst system useful in embodiments of the present invention include at least one metallocene catalyst component as described herein. Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component is supported on a support material in an embodiment, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Or the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof, and heterocyclic versions thereof.

Group 15-Containing Catalyst Component

One aspect of the present invention includes the use of so called "Group 15-containing" catalyst components as described herein as a desirable catalyst component, either alone or for use with a metallocene or other olefin polymerization catalyst component. Generally, "Group 15-containing catalyst components", as referred to herein, include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. No. 5,318,935; U.S. Pat. No. 5,889,128 U.S. Pat. No. 6,333,389 B2 and U.S. Pat. No. 6,271,325 B1.

In one embodiment, the Group 15-containing catalyst components useful in embodiments of the present invention include Group 4 imino-phenol complexes, Group 4 bis(amide) complexes, and Group 4 pyridyl-amide complexes that are active towards olefin polymerization to any extent.

Activator

As used herein, the term "activator" is defined to be any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments of the present invention are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

It is within the scope of this invention to use Lewis acids such as alumoxane (e.g., "MAO"), modified alumoxane (e.g., "TIBAO"), and alkylaluminum compounds as activators, and/or ionizing activators (neutral or ionic) such as tri(n-butyl)ammonium tetrakis(pentafluorophenyl)boron and/or a trisperfluorophenyl boron metalloid precursors to activate metallocenes described herein. MAO and other aluminum-based activators are well known in the art. Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). The activators may be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347-1374 (2000).

Ziegler-Natta Catalyst Component

The catalyst composition may comprise a catalyst component, which is (or includes) a non-metallocene compound. In an embodiment, the catalyst component comprises a Ziegler-Natta catalyst compound, such as disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that may be used in the present invention include transition metal compounds from Groups 3 to 17, or Groups 4 to 12, or Groups 4 to 6 of the Periodic Table of Elements.

These conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot \frac{1}{3}AlCl_3$ and $Ti(OC_{12}H_{25})Cl_3$.

Conventional-type transition metal catalyst compounds based on magnesium/titanium electron-donor complexes that are useful in embodiments of the invention are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type cocatalyst compounds for the above conventional-type transition metal catalyst compounds may be represented by the formula $M^3M^4_v X^2_c R^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

Polymerization

Polymerization may be conducted using the above catalysts and monomers selected from ethylene and one or more α-olefins selected from 1-butene, 1-hexene, 4-methyl-1-pentene, 1-octene or 1-decene.

In order to provide a better understanding of the present invention, the following examples are offered as related to actual tests performed in the practice of the invention:

EXAMPLES

The polymerization reactions described herein were conducted in a continuous pilot-scale gas phase fluidized bed reactor of 0.57 meters internal diameter and 4.0 meters in bed height. The fluidized bed was made up of polymer granules. The gaseous feed streams of ethylene and hydrogen together with liquid comonomer were mixed together in a mixing tee arrangement and introduced below the reactor bed into the recycle gas line. Hexene was used as comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream.

The solid catalyst was injected directly into the fluidized bed using purified nitrogen as a carrier. Its rate was adjusted to maintain a constant production rate. The reacting bed of growing polymer particles was maintained in a fluidized state by the continuous flow of the make up feed and recycle gas through the reaction zone. A superficial gas velocity of 0.6-0.9 meters/sec was used to achieve this. The reactor was operated at a total pressure of 2170 kPa. To maintain a constant reactor temperature, the temperature of the recycle gas was continuously adjusted up or down to accommodate any changes in the rate of heat generation due to the polymerization.

The fluidized bed was maintained at a constant height (4.0 meters) by withdrawing a portion of the bed at a rate equal to the rate of formation of particulate product. The rate of product formation (the polymer production rate) was in the range of 50-70 kg/hour. The product was removed semi-continuously via a series of valves into a fixed volume chamber, which was simultaneously vented back to the reactor. This allows for highly efficient removal of the product, while at the same time recycling a large portion of the unreacted gases back to the reactor. This product was purged to remove entrained hydrocarbons and treated with a small steam of humidified nitrogen to deactivate any trace quantities of residual catalyst.

FIG. 1 is a schematic of the pilot-scale fluidized bed reactor and the approximate locations of the static measuring instruments.

Readings from the static probes were measured in the form of an electrical current. The current was measured by a Keithley Model 6517A electrometer (operating in current mode). Data from multiple probes were collected simultaneously using a scanner card in the Model 6517A electrometer. Data from each probe were collected at 125 readings/second, and an average value was reported every six seconds. Alternatively, the probes were connected to a dedicated Keithley Model 485 picoammeter. In this alternate case each static probe was connected continuously to the meter, which reported "spot" or instantaneous values of the current every 5 seconds. Data reported from both types of current meters was recorded in a computer log, and used to generate the plots shown in FIGS. 4-7.

FIG. 4 shows a dome sheeting incident with a metallocene catalyst, XCAT EZ 100, supplied commercially by Univation Technologies, LLC on the pilot-scale gas phase reactor. The six traces at the top of the chart show the skin thermocouple readings (wall temperatures) in the dome. As is well known in the art, sheeting (and in this case dome sheeting) is indicated by the rapid rise (or spikes) in the skin thermocouple readings. The recycle line static reading showed a steep rise prior to the dome sheeting incidents, followed by a sudden decrease. The decrease in measured conveying (recycle) line static is believed to be the result of a reduction in the rate of solids carryover from the reactor. The decrease in solids carryover rate appeared to coincide with the formation of the dome sheet.

FIG. 5 shows four successive dome sheeting incidents with XCAT EZ 100 metallocene catalyst on the pilot-scale gas phase reactor. The six traces at the top of the chart show the skin thermocouples in the dome. The corresponding scale is shown to the right. Dome sheeting is indicated by the rapid rise (or spikes) in the skin thermocouple readings. Each of the four incidents produced a dome sheet of sufficient size to block the product discharge port and interfere with fluidization. In each of the four cases the operators were forced to shut down the reactor for cleaning.

The recycle line carryover static reading is indicated by the bottom trace in FIG. 5. The corresponding scale is shown to the left. Note the steep rise in recycle line static prior to each dome sheeting incident. In the first, third and fourth incidents the recycle line static reached 200 picoamps. In the second incident the recycle line static peak reached 95 picoamps.

FIG. 6 shows the same dome sheeting incidents of FIG. 5, with readings from the distributor plate static probes added for comparison. As can be seen in the chart, the distributor plate static probes showed some response prior to the dome sheeting incidents but the response was not significant, and was not consistent. Since the plate probes are in contact with the same entrained fines, we would have expected them to show a response equivalent (and proportional) to that of the recycle line probe. The reason for the difference is not known.

FIG. 7 shows a reactor wall sheeting incident with a metallocene catalyst, XCAT HP 100 catalyst, which is supplied commercially by Univation Technologies, LLC. In this case, a significant response on both of the distributor plate probes was observed prior to the sheeting incident.

FIG. 7 also provides an excellent illustration of the measurement problem that was described previously, that conventional reactor static probes do not provide a meaningful indication prior to a sheeting event with metallocene catalyst. As shown by the reactor trace in the figure, there was no response on the conventional reactor static probe prior to (or during) the wall sheeting incident.

FIG. 8 shows the wall sheeting data of FIG. 7 with the recycle line carryover static added for comparison. As can be seen in the figure, the recycle line probe did not provide a significant response prior to the wall sheeting incident. The only significant response from this probe occurred well after the wall sheet was formed. This is an indication that all probes present in a reactor system should be monitored, as some may not register static, while others may register static, enabling control through use of continuity additives.

The experimental data provides some important and unexpected results; that the recycle line carryover static probes provide a meaningful response prior to a dome sheeting incident with metallocene catalyst. The distributor plate probes apparently do not provide a prior indication for dome sheeting.

Conversely, in the case of wall sheeting, the distributor plate probes provide meaningful responses prior to a wall sheeting incident with metallocene catalyst, but the recycle line probe apparently does not. Although these results represent the reverse of the findings with dome sheeting, the present invention clearly provides a solution to the problem of dome and wall sheeting with metallocene catalyst. The carryover static is measured in both locations, the recycle line and distributor plate (or equivalents), and these measurements are used in combination with static control means to maintain the carryover static to near-zero levels.

To determine effective control means for maintaining the carryover static at near-zero levels, various continuity additives were tested as a solution in hexane or as a solid slurry in mineral oil. The solid slurry was used for the insoluble components (aluminum stearate), while a hexane solution was used for the aluminum oleate and commercially available products sold by Associated Octel Company under the trademark OCTASTAT 3000 and OCATSTAT 2000. The aluminum oleate solution concentration was prepared as 0.40 weight percent; the OCTASTAT 2000 and 3000 solution concentrations were 0.53 weight percent. These solutions were fed into the reaction zone using a positive displacement pump with an effective range of 100-1200 cc/hr. The aluminum stearate slurry was prepared by adding the solid aluminum stearate to mineral oil that had been degassed for 24 hours at 80-100° F. with nitrogen. The resulting slurry concentration was 5.66 weight percent. The slurry was fed into the reaction zone using a syringe pump with an effective pumping range of 1-100 cc/hr. Isopentane was used as a flush in the feed line to the reactor as well.

Data from pilot-scale polymerization reactions indicate that separate addition and independent control of several additives can control and mitigate sheeting in both the dome and lower sections of a fluidized bed reactor. Many of the continuity additives are relatively insoluble so they were fed as a slurry in mineral oil, as described above. Soluble materials were dissolved in hexane and fed directly to the reactor.

The following compounds were tested with the XCAT HP 200 and XCAT EZ 100 metallocene catalyst systems:
Aluminum oleate (solution)
Aluminum stearate (slurry)
OCTASTAT 3000 (solution)
OCTASTAT 2000 (solution)
AS-990 (slurry)
ATMER 163 (solution)

Two series of tests were performed, one with XCAT HP 200 metallocene catalyst and the other on XCAT EZ 100 metallocene catalyst. The XCAT HP 200 metallocene catalyst test protocol started by running on a dry blend of the catalyst with aluminum distearate (3% based on the weight of the catalyst). The additive feed was then started and the reactor was allowed to line out. The catalyst was then switched to one where the aluminum distearate was absent, termed "bare catalyst," assuming there were no operability problems while the additive was still being added to the reactor. The feed rates of the additive were increased in stages up to around 20 ppm by weight, via a separate continuity additive feed line. The final step was to reduce the additive flow to zero on the bare catalyst. The XCAT EZ100 metallocene catalyst tests were conducted during attempts to evaluate operability performance of catalysts planned for commercial testing. In this case, AS-990 was added in response to cold skin thermocouple readings (i.e. negative excursions from normal temperatures) to allow for continuous operation on XCAT EZ100 metallocene catalyst. The additives that produced positive results were:

Aluminum stearate
AS-990
Aluminum oleate
OCTASTAT 2000

Several important findings were observed during these trials. When bare catalyst was used without separate addition of the continuity additive, cold skin temperature readings would develop. In some cases these proceeded to get progressively worse until they suddenly reversed themselves and resulted in a sheeting incident. Higher levels of carryover static were also observed with the blended catalyst/continuity additive. The carryover static was reduced by addition of higher levels of the continuity additive, generally by separate addition of continuity additive (separate from the catalyst blended with continuity additive). Increased levels of carryover static corresponded to increased levels of reactor static. As the continuity additive flow was increased, the carryover static decreased. Finally, two sheeting incidents were characterized by a progressive drop in the carryover static followed by a sudden increase in the carryover static. Running with "bare" catalyst precipitated these sheeting incidents. At this point, skin thermocouple excursions and sheeting occurred. Although the precise mechanism for this is unclear, it appears that the catalyst was attracted to the walls as evidenced by the drop in carryover static. When the skin temperature excursion takes place the catalyst was apparently released and the carryover static suddenly increased.

During testing of the various continuity additives, visual observations were made on the dome of the fluidized bed reactor. While running with the catalyst/continuity additive blend, a dome coating was always present. As the additive level was increased, generally through a separate feed line, progressive clearing of the dome took place until it completely cleared up to a bare metal wall. For aluminum stearate, this required a total concentration of 10-15 ppm by weight (ppmw), based on production rate. When the aluminum stearate is blended with the catalyst, productivity constraints limit the concentration of stearate to 6 ppm by weight, as a percentage of the blend (this is an approximate level, but above this level the blend becomes awkward or difficult to handle, therefore provides a practical limitation with today's materials and feed mechanisms). The higher activity version of the metallocene catalyst resulted in even lower levels, 3-4 ppmw maximum inclusion in the blend, demonstrating the need for separate addition of the additive.

Testing with XCAT EZ 100 metallocene catalyst was plagued in pilot plant polymerization reactions by dome sheeting incidents. However, demonstrations of the invention using the continuity additive AS-990 removed the cold skin temperature readings and eliminated sheeting. For example, a 10-day run ran smoothly without any operability problems when a slurry of AS-990 in mineral oil was fed to the reactor to eliminate cold skin temperature readings near the plate and in the expanded section. The AS-990 level in the bed (from the additional feed) averaged about 10-30 ppm (based on bed weight). An attempt to run without AS-990, resulted in skin temperature excursions.

FIG. 9 shows data from the pilot plant polymerization reactions in the practice of the invention. The data covers a thirteen day period.

The various lines at the top of the plot are the skin temperatures of the reactor. The lower dashed line showing step changes is the flow rate of the continuity additives. The flow rates were manually recorded and varied from 0 to 20 ppm. Point 1 shows the effect on the skin temperatures when the bare catalyst was run, which shows the development of cold skin temperature readings. As the aluminum oleate flow was increased, the cold skin temperature readings cleared up. Further increases in the flow caused cold skin temperature readings to again develop. This demonstrates that there is an optimum level for this additive.

Point 2 shows the result of turning off the flow of the aluminum oleate and running with bare catalyst. This demonstrates that reduction of the additive has different effects than increasing it—no cold skin temperature readings but a skin temperature excursion. This corroborates that that an optimum level of additive is needed. Overall the runs with aluminum distearate were very stable and no cold skin temperature excursions were observed. At point 3, the catalyst introduced was switched to bare catalyst, which resulted in cold skin temperatures again developing, but no positive skin temperature excursions.

Point 4 shows results with OCTASTAT 2000. This additive, similar to the aluminum oleate has an optimum level. Once the flow of continuity additive was increased too much cold skin temperatures started to develop.

The plot of FIG. 10 corresponds to that in FIG. 9, but in this case three different static measurements are shown. The top line labeled reactor static 1, is a plot of the reactor static using a current probe, the middle labeled reactor static 2, line is a plot of the reactor static using a voltage probe, and the bottom line is a plot of the carryover static. The carryover static is measured in absolute value terms. The dashed line is the flow of the continuity additives as described above.

The carryover static drops during periods of cold skin temperature formation at Points 1, 3 and 4, although to a lesser extent at point 3. The circled points show the addition of blended catalyst containing aluminum distearate. At all other times in FIG. 9, bare catalyst was being fed. This demonstrates that carryover static is increased when just bare catalyst is fed, relative to bare catalyst and with separate addition of the continuity additive.

FIGS. 11 and 12 show plots similar to those above, but with OCTASTAT®. In FIGS. 11 and 12, point 1 corresponds to a concentration of approximately 5 ppm by weight of OCTASTAT 3000 (total in the reactor), low carryover static, and cold skin temperature formation occur. However, as the flow rate of the OCTASTAT 3000 was increased (above 5 ppm), the cold skin temperatures disappeared, which demonstrated again the need for an optimum level of the additive (additive amounts are shown by the dashed line). In FIGS. 11 and 12, at point 2 the reactor was running with bare catalyst and a concentration of approximately 41 ppm of OCATSTAT 3000. The OCTASTAT flow was then stopped. Cold skin temperatures began to develop immediately and at the same time the carryover static began to decrease. In contrast to many other continuity additives, this effect occurred immediately and there was no lag in the cold skin temperature development.

FIGS. 11 and 12 demonstrate that reactor (conventional static probe(s)) static was not as readily correlatable with cold skin temperature formation as carryover static measurements.

Although reactor static did show some small changes corresponding to changes in reactor conditions, the reactor static changes were not as great as the carryover static changes. In addition, this demonstrated how progressive cold skin temperatures, if left too long, can turn into a positive skin temperature excursion. Moreover, this demonstrated that the carryover static decreased along with the cold skin temperatures until it reached a critical level at which point it began to rapidly increase, followed by a major excursion of the skin temperature, which necessitated a reactor shutdown.

While the present invention has been described and illustrated by reference to particular embodiments, it will be appreciated by those of ordinary skill in the art that the invention lends itself to variations not necessarily illustrated herein. For this reason, then, reference should be made solely to the appended claims for purposes of determining the true scope of the present invention.

What is claimed is:

1. A process for monitoring the static generated during a gas-phase polymerization to avoid or minimize reactor discontinuity events comprising:
   measuring carryover static using one or more of at least one static probe; wherein the at least one static probe measures current in the range of ±0-50 nanoamps/cm$^2$ or ±0.01-25 nanoamps/cm$^2$;
   adding at least one continuity additive to the polymerization in an amount effective to maintain levels of electrostatic activity at or near zero, wherein the at least one continuity additive comprises an ethoxylated stearyl amine and an aluminum distearate, each present in said process in an amount ranging from 1-250 ppm, based on the total polymer produced in said process and wherein the ratio of said ethoxylated stearyl amine and said aluminum distearate ranges from 10:90 to 90:10.

2. The process of claim 1, wherein the at least one static probe is one of more of a recycle line static probe, an annular disk static probe, an upper bed static probe, or a distributor plate static probe.

3. The process of claim 2, wherein said process comprises measuring carryover static with at least one distributor plate static probe and/or at least one recycle line static probe.

4. The process of claim 3, wherein said process further comprises measuring carryover static with at least one upper reactor static probe.

5. The process of claim 1, wherein the at least one static probe measures current in the range of ±0.01-25 nanoamps/cm$^2$.

6. The process of claim 1, wherein the at least one static probe measures current in the range of ±0.01-20 nanoamps/cm$^2$.

7. The process of claim 1, wherein the at least one static probe measures current in the range of ±0.1-15 nanoamps/cm$^2$.

8. The process of claim 1, wherein the at least one static probe measures current in the range of ±0.1-10 nanoamps/cm$^2$.

9. The process of claim 1, wherein said at least one continuity additive comprises an ethoxylated stearyl amine and an aluminum distearate, each present in said process from 10-40 ppm, based on the amount of copolymer produced.

10. The process of claim 1, wherein said at least one continuity additive comprises an ethoxylated stearyl amine and an aluminum distearate, and wherein said effective amount ranges from 1-100 ppm of each said ethoxylated stearyl amine and said aluminum distearate, based on the total amount of said polymerized ethylene and one or more α-olefins.

11. A process for introducing at least one continuity additive into a reactor system in an amount that prevents or reverses sheeting of polymer produced by a polymerization reaction of at least one olefin, wherein the polymerization reaction is conducted in the reactor system, the reactor system comprising a fluidized bed reactor, an entrainment zone, a catalyst feed for introducing a catalyst system capable of producing the polymer, at least one continuity additive feed for introducing the at least one continuity additive independently of the catalyst mixture, a means for monitoring levels of electrostatic activity in the entrainment zone, the process comprising:
   (a) contacting the at least one olefin with the catalyst system under polymerization conditions in the fluidized bed reactor;
   (b) introducing the at least one continuity additive into the reactor system at anytime before, during, or after start of the polymerization reaction wherein the at least one continuity additive comprises a mixture of 1 decene-polysulfone present in a concentration of 5 to 15 percent by weight of said mixture, a reaction product of N-tallow-1,3-diaminopropane and epichlorohydrin present in a concentration of 5 to 15 percent by weight of said mixture, dodecylbenzenesulfonic acid present in a concentration of 5 to 15 percent by weight of the mixture, and a hydrocarbon solvent in a concentration of 60 to 88 percent by weight of the mixture;
   (c) monitoring the levels of electrostatic activity in the entrainment zone by using at least one static probe, wherein the at least one static probe measures current in the range of ±0-50 nanoamps/cm$^2$ or ±0.01-25 nanoamps/cm$^2$; and
   (d) adjusting the amount of the at least one continuity additive introduced into the reactor system to maintain the levels of electrostatic activity in the entrainment zone at or near zero.

12. The process of claim 11, wherein the catalyst system comprises a metallocene, a Group 15-containing catalyst, or a conventional transition metal catalyst.

13. The process of claim 11, wherein the process is a gas phase process.

14. The process of claim 11, wherein the monomers comprise ethylene or ethylene and one or more alpha-olefins.

15. The process of claim 11, wherein the amount of the at least one continuity additive in the fluidized bed reactor is maintained at a concentration of 1 to 50 parts per million based on the weight of the polymer produced in the fluidized bed reactor.

16. The process of claim 11, wherein the at least one static probe measures current in the range of ±0.01-20 nanoamps/cm$^2$.

17. The process of claim 11, wherein the at least one static probe measures current in the range of ±0.1-15 nanoamps/cm$^2$.

18. The process of claim 11, wherein the at least one static probe measures current in the range of ±0.1-10 nanoamps/cm$^2$.

19. A polymerization process comprising:
   polymerizing ethylene and one or more alpha-olefins in the presence of one or more metallocene catalysts in a gas phase reactor;
   monitoring electrostatic activity in said gas phase reactor by using at least one static probe, wherein the at least one static probe measures current in the range of ±0-50 nanoamps/cm$^2$ or ±0.01-25 nanoamps/cm$^2$;
   applying an effective amount of one or more continuity additives to said polymerization process to maintain said electrostatic activity to or at near zero wherein said one or more continuity additives comprises an ethoxylated stearyl amine and an aluminum distearate, each present in said process in an amount ranging from 1-250 ppm, based on the total polymer produced in said process and wherein the ratio of said ethoxylated stearyl amine and said aluminum distearate ranges from 10:90 to 90:10.

20. The process of claim 19, wherein the at least one static probe is one or more of at least one recycle line static probe, at least one upper bed static probe, at least one annular disk static probe, or at least one distributor plate static probe.

21. The process of claim 19, wherein said effective amount of said one or more continuity additives is greater than 1 or less than 250 ppm based on the weight of polymer produced.

22. The process of claim 19, wherein the at least one static probe measures current in the range of ±0.01-25 nanoamps/cm$^2$.

23. The process of claim 19, wherein the at least one static probe measures current in the range of ±0.01-20 nanoamps/cm$^2$.

24. The process of claim 19, wherein the at least one static probe measures current in the range of ±0.1-15 nanoamps/cm$^2$.

25. The process of claim 19, wherein the at least one static probe measures current in the range of ±0.1-10 nanoamps/cm$^2$.

26. The process of claim 19, wherein said one or more continuity additives comprises an ethoxylated stearyl amine and an aluminum distearate, each present in said process from 10-40 ppm, based on the amount of copolymer produced.

27. The process of claim 19, wherein said one or more continuity additives comprises an ethoxylated stearyl amine and an aluminum distearate, and wherein said effective amount ranges from 1-100 ppm of each said ethoxylated stearyl amine and said aluminum distearate, based on the total amount of said polymerized ethylene and one or more α-olefins.

* * * * *